US011256398B2

(12) United States Patent
Flynn, III et al.

(10) Patent No.: US 11,256,398 B2
(45) Date of Patent: *Feb. 22, 2022

(54) SYSTEMS AND METHODS FOR PROVIDING RESPONSES TO AND DRAWINGS FOR MEDIA CONTENT

(71) Applicant: META PLATFORMS, INC., Menlo Park, CA (US)

(72) Inventors: William Joseph Flynn, III, San Francisco, CA (US); Timothy Paul Omernick, Kamigyo-ku (JP); Nilesh Vinubhai Patel, Mountain View, CA (US); William Samuel Bailey, San Francisco, CA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/722,120

(22) Filed: Dec. 20, 2019

(65) Prior Publication Data

US 2020/0125241 A1  Apr. 23, 2020

Related U.S. Application Data

(63) Continuation of application No. 14/542,488, filed on Nov. 14, 2014, now Pat. No. 10,558,338.

(60) Provisional application No. 62/004,120, filed on May 28, 2014, provisional application No. 62/004,115, filed on May 28, 2014.

(51) Int. Cl.
*G06F 3/0484* (2013.01)
*G06F 3/0488* (2013.01)
*H04L 29/06* (2006.01)
*G06F 3/04842* (2022.01)
*H04L 65/612* (2022.01)

(52) U.S. Cl.
CPC ........ *G06F 3/04842* (2013.01); *G06F 3/0488* (2013.01); *H04L 65/4084* (2013.01)

(58) Field of Classification Search
CPC ......... G06F 3/048; G06F 3/0484–0486; G06F 3/0488–04886; G06Q 50/01; H04L 51/08–10; H04L 65/4084; G06T 11/60
See application file for complete search history.

(56) References Cited

U.S. PATENT DOCUMENTS 6,208,340 B1  3/2001  Amin et al.
6,348,936 B1  2/2002  Berteig
(Continued)

OTHER PUBLICATIONS

Toonboxstudio. "Basics to Sketchbook Pro 6 for Beginners Tutorial." YouTube. YouTube, Dec. 13, 2012. Web. Sep. 22, 2016. <https://www.youtube.com/watch?v=ZDUWspKTvtO>.

(Continued)

*Primary Examiner* — Liang Y Li
(74) *Attorney, Agent, or Firm* — Hunton Andrews Kurth LLP

(57) ABSTRACT

Systems, methods, and non-transitory computer-readable media can detect an initiation of a drawing to a media content item. A first drawing option that is selectable via a first dimension can be provided. A second drawing option that is selectable via a second dimension can be provided. A first current state of the first drawing option and a second current state of the second drawing option can be indicated.

20 Claims, 23 Drawing Sheets

(56) References Cited

U.S. PATENT DOCUMENTS

| | | | |
|---|---|---|---|
| 7,562,310 B2 | 7/2009 | Champion | |
| 7,593,603 B1 * | 9/2009 | Wilensky | G06T 5/00 |
| | | | 358/1.2 |
| 8,468,465 B2 | 6/2013 | Warner | |
| 9,186,579 B2 | 11/2015 | Gross | |
| 9,619,108 B2 | 4/2017 | Dowd | |
| 10,025,460 B1 | 7/2018 | Almand et al. | |
| 10,055,103 B1 * | 8/2018 | Ozuysal | G06F 3/0482 |
| 2004/0046795 A1 | 3/2004 | Josephson | |
| 2007/0150340 A1 | 6/2007 | Cartmell | |
| 2008/0288857 A1 | 11/2008 | Duncan | |
| 2009/0138800 A1 | 5/2009 | Anderson | |
| 2011/0214044 A1 | 9/2011 | Davis | |
| 2012/0162242 A1 | 6/2012 | Amano et al. | |
| 2013/0016126 A1 * | 1/2013 | Wang | G06F 3/0488 |
| | | | 345/650 |
| 2013/0019204 A1 | 1/2013 | Kotler | |
| 2013/0067394 A1 | 3/2013 | Nan et al. | |
| 2013/0104054 A1 | 4/2013 | Cao | |
| 2013/0316695 A1 | 11/2013 | Park | |
| 2013/0346876 A1 | 12/2013 | Yerli | |
| 2014/0047022 A1 * | 2/2014 | Chan | H04L 12/1822 |
| | | | 709/204 |
| 2014/0085487 A1 | 3/2014 | Park | |
| 2014/0115535 A1 | 4/2014 | Cocco et al. | |
| 2014/0192134 A1 | 7/2014 | Jung | |
| 2015/0106211 A1 | 4/2015 | Khalil | |
| 2015/0172144 A1 | 6/2015 | Karoubi | |
| 2015/0172238 A1 | 6/2015 | Ahmed | |
| 2015/0177854 A1 | 6/2015 | Letzelter | |
| 2015/0277728 A1 * | 10/2015 | Kuznetsov | G06F 3/04847 |
| | | | 715/771 |
| 2015/0317321 A1 | 11/2015 | Tang et al. | |
| 2017/0060820 A1 | 3/2017 | Ficklin | |

OTHER PUBLICATIONS

Fitchard, Kevin, "Pinger Goes After Snapchat and Vine with a New GIF Chat App," Gigaom.com webposting, Aug. 8, 2013 [retrieved online at https://gigaom.com/2013/08/08/pinger-goes-after-snapchat-and-vine-with-a-new-gifchat-app on Aug. 30, 2016].

* cited by examiner

850

Receive an obscured version of a third media content item prior to transmitting the obscured version of the second media content item
852

Provide access to the obscured version of the third media content item
854

Prevent access to an unobscured version of the third media content item
856

Transmit at least one of the unobscured version of the second media content item or the obscured version of the second media content item
858

Provide access to the unobscured version of the third media content item within an allowable time period
860

FIGURE 8B

SYSTEMS AND METHODS FOR PROVIDING RESPONSES TO AND DRAWINGS FOR MEDIA CONTENT

CROSS-REFERENCE TO RELATED APPLICATION

The present application is a Continuation Application of U.S. application Ser. No. 14/542,488 filed Nov. 14, 2014, which claims priority to U.S. Provisional Application No. 62/004,120, filed on May 28, 2014 and titled "Systems And Methods For Providing Responses To And Drawings For Media Content" which is incorporated by reference herein in its entirety. The present application also claims priority to U.S. Provisional Application No. 62/004,115, filed on May 28, 2014 and titled "Systems And Methods For Providing Responses To And Drawings For Media Content" which is incorporated by reference herein in its entirety.

FIELD OF INVENTION

The present technology relates to the field of content sharing. More particularly, the present technology provides techniques for providing responses to and drawings for media content that is interactively exchanged.

BACKGROUND

The use of computing devices is becoming increasingly commonplace. Users of computing devices often browse web sites, access online content, interact with social networks, or perform a wide variety of tasks. Users can utilize computing devices to engage in communication. For example, under conventional approaches, a sending user can transmit a first text message to a recipient user. The recipient user can receive the first text message transmitted by the sending user. Upon receiving the first text message, the recipient user can view, read, access, or otherwise interact with the first text message. Moreover, the recipient user can decide to respond to the first text message by transmitting a second text message back to the original sending user. The original sending user can receive the second text message and can view, read, access, or otherwise interact with the second text message. In another example, under conventional approaches, the sending user can transmit media content, such as images, audio, videos, and text, to the recipient. The recipient user can receive the media content and can access, view, or otherwise interact with the media content upon receipt. However, conventional approaches to communications can be uninteresting, boring, or not sufficiently interactive. These and other similar concerns can reduce or create challenges for the overall user experience associated with using computing devices to engage in communication.

SUMMARY

Various embodiments of the present disclosure can include systems, methods, and non-transitory computer readable media configured to detect an initiation of a drawing to a media content item. A first drawing option that is selectable via a first dimension can be provided. A second drawing option that is selectable via a second dimension can be provided. A first current state of the first drawing option and a second current state of the second drawing option can be indicated.

In an embodiment, the detecting of the initiation of the drawing to the media content item can further comprise determining that a user has activated a drawing mode to draw on the media content item. In some instances, the media content item can be included for transmission in an interactive exchange of media content.

In an embodiment, the drawing can be overlaid on top of the media content item. In some cases, the drawing overlaid on top of the media content item can be included for transmission in the interactive exchange of media content.

In an embodiment, the first dimension can be associated with a vertical direction. The first drawing option can be provided as a vertical color bar.

In an embodiment, the second dimension can be associated with a horizontal direction. The second drawing option can be provided as a drawing tool size option that is selectable in the horizontal direction.

In an embodiment, the first current state of the first drawing option can include a current color selection and the second current state of the second drawing option can include a current drawing tool size selection. In some instances, the indicating of the first current state of the first drawing option and the second current state of the second drawing option can further comprise providing a circular indicator that indicates in real-time the current color selection and the current drawing tool size selection.

In an embodiment, the circular indicator can include an outer ring configured to change in color to indicate the current color selection.

In an embodiment, at least a portion of the circular indicator can increase in size when the current drawing tool size selection increases. The at least the portion of the circular indicator can decrease in size when the current drawing tool size selection decreases.

In an embodiment, the circular indicator can be moved based on a user touch gesture to select at least one of the first drawing option or the second drawing option.

In an embodiment, audio can be played based on the drawing to the media content item. In some cases, the audio can include at least one of a music track or a sound effect.

Many other features and embodiments of the invention will be apparent from the accompanying drawings and from the following detailed description.

BRIEF DESCRIPTION OF THE DRAWINGS

FIG. 8B illustrates an example method for interactively exchanging media content, according to an embodiment of the present disclosure.

Figure 1A:
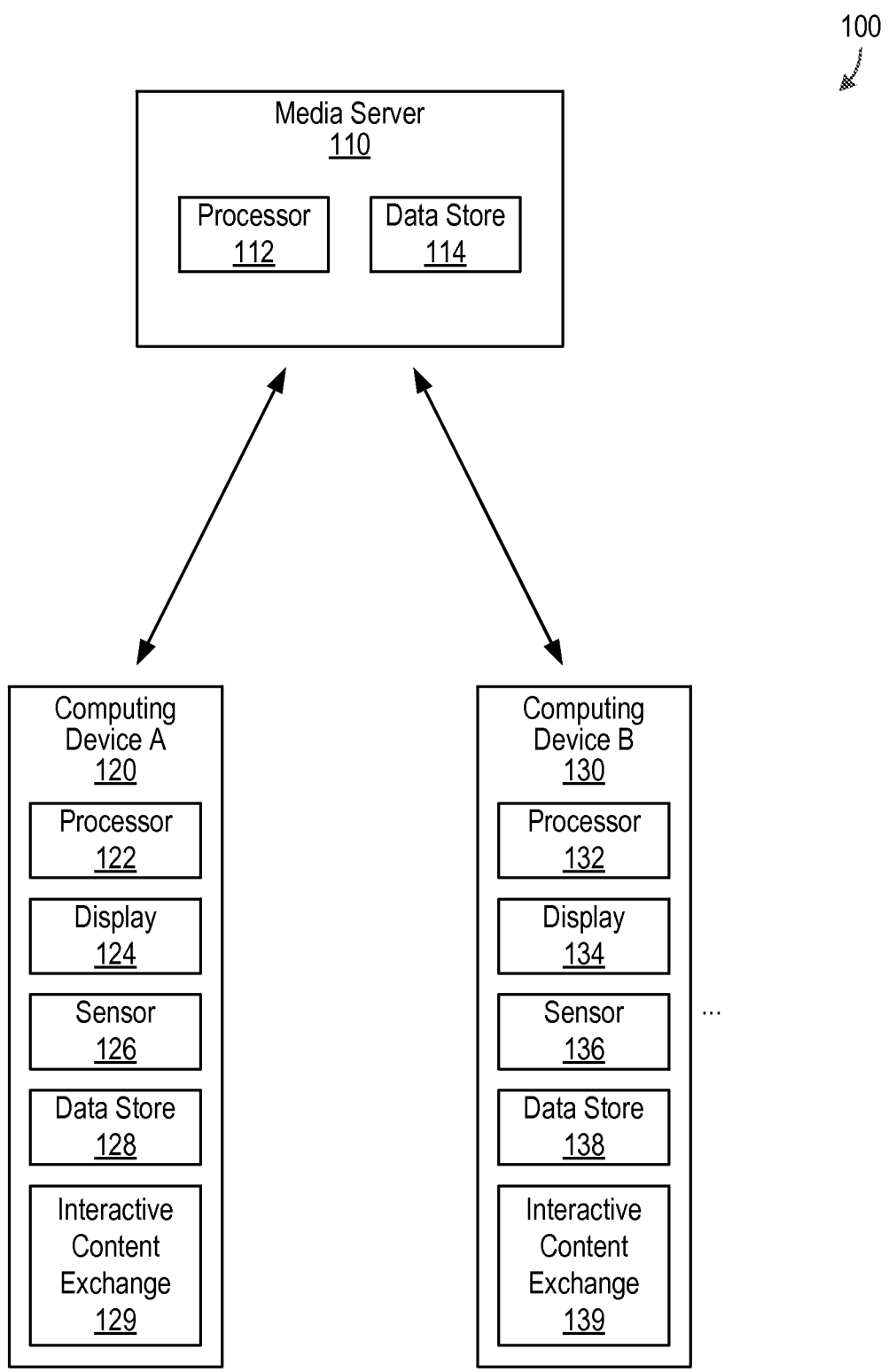
FIG. 1A illustrates an example system configured to provide for interactively exchanging media content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Interactive Media Content Exchange

People often communicate or exchange information using computing devices (or systems). Conventional approaches to communicating via computing devices can include text messaging, such as short message service (SMS) and multimedia messaging service (MMS). For example, under conventional approaches, a first computing device can transmit a communication, including text, images, audio, and/or video, etc., to a second computing device over a cellular or local network. The second computing device can receive the communication and immediately (or almost immediately) view, access, or otherwise interact with the content included in the communication.

Content associated with these conventional approaches to communication can be considered as being provided for "free", in that the recipient of the content can access, view, or interact with the content upon receipt of the content without any significant effort. For example, when a recipient computing device receives an image, a user of the computing device can select, click, or tap on, etc., the image to view and/or download the image.

As such, conventional approaches generally involve a sending party creating or producing content, and then sending the created or produced content to a receiving party. The receiving party receives and consumes (e.g., uses, views, accesses, interacts with, etc.) the content. However, these and other similar types of conventional approaches to providing communications can be boring, uninteresting, and/or not sufficiently interactive. Various embodiments of the present disclosure can utilize computing devices (or systems) to provide for interactively exchanging media content.

FIG. 1A illustrates an example system 100 configured to provide for interactively exchanging media content, according to an embodiment of the present disclosure. The example system 100 can include a media server 110 and one or more computing devices (e.g., computing device A 120, computing device B 130, computer system 1000 in FIG. 10, etc.). In some embodiments, the media server 110 can comprise at least one processor 112 and at least one data store 114. The at least one processor 112 can be configured to facilitate performing various tasks of the media server 110. The at least one data store 114 can be configured to store various types of data and information, such as media content.

In the example of FIG. 1A, the one or more computing devices can include a first computing device (e.g., computing device A) 120 and a second computing device (e.g., computing device B) 130. Computing device A 120 can comprise at least one processor 122, at least one display 124, at least one sensor 126, and at least one data store 128. Similarly, computing device B 130 can also comprise at least one processor 132, at least one display 134, at least one sensor 136, and at least one data store 138. For each computing device (e.g., computing device A 120, computing device B 130, etc.), the at least one processor (e.g., processor 122, processor 132, etc.) can facilitate various operations of the respective device. Each of the display elements 124 and 134 can be configured to display or present visual content. Each of the sensors 126 and 136 can be configured to acquire, gather, determine, and/or detect data. In some cases, each of sensors 126 and 136 can include (but is not limited to) at least one of a touch sensor (e.g., touch display), an audio sensor (e.g., microphone), or an image sensor (e.g., camera), an accelerometer, a gyroscope, a locational sensor (e.g., GPS), etc. Moreover, the data stores 128 and 138 can be configured to store information associated with operations of the computing devices.

Various embodiments of the present disclosure can provide a "pay-to-play" approach to interactively sharing or exchanging content. For example, a recipient of content, which is included in a received communication, must "pay a cost" or exert some specified effort, such as by providing additional content in a reply to the received communication, in order to fully access the content in the received communication.

With reference to FIG. 1A, in some embodiments, an interactive content exchange module/component 129 included with computing device A 120 can cause computing device A 120 to acquire a first media content item (e.g., image, video, etc.) using the at least one sensor 126 (e.g., camera). For example, a user of computing device A 120 can initiate and utilize the interactive content exchange component 129 to cause a front-facing and/or rear-facing camera on computing device A 120 to take a photo or video. The acquired first media content item (e.g., photo, video, etc.) can correspond to an original, full resolution, and/or unobscured (e.g., substantially clear, unaltered, etc.) version of the first media content item. In some implementations, the interactive content exchange module 129 can cause computing device A 120 to generate an obscured (e.g., pixelated, blurred, censored, obstructed, shrunken, visibly unclear, etc.) version of the first media content item based on the unobscured version. In some implementations, the interactive content exchange module 129 can cause computing device A 120 to transmit the unobscured (and/or full resolution) version of the first media content item to the media server 110, and the media server 110 can generate the obscured version of the first media content item based on the unobscured version.

Furthermore, the interactive content exchange module 129 can cause computing device A 120 to transmit the obscured and unobscured versions of the first media content item to computing device B 130. In some embodiments, the transmission of the obscured and unobscured versions of the first media content item from computing device A 120 to computing device B 130 can be performed via the media server 110. For example, the media server 110 can relay communications, including content, between computing device A 120 and computing device B 130.

When computing device B 130 receives the obscured (e.g., pixelated, shrunken, etc.) and unobscured (e.g., substantially clear, full-resolution, etc.) versions of the first media content item, an interactive content exchange module/component 139 can enable computing device B 130 to provide access to the obscured version of the first media content item while preventing access to the unobscured version of the first media content item. The obscured version of the first media content item can correspond to a pixelated, shrunken, thumbnail preview of the unobscured (and/or full-resolution) version of the first content item. Often times, the obscured version can hook or grab the interest and/or attention of a user of computing device B 130, without permitting the user to access the unobscured (e.g., full-resolution, substantially clear, original, etc.) version of the first media content item. As such, the user of computing device B 130 might desire to see the unobscured version of the first media content item.

In order to access the unobscured version of the first media content item, the interactive content exchange module 139 can enable the user of computing device B 130 to utilize the at least one sensor 136 (e.g., front-facing camera, rear-facing camera, etc.) to acquire a second media content item (e.g., image, video, etc.), which can correspond to an unobscured (e.g., full-resolution, original, unaltered, etc.) version. The interactive content exchange module 139 can cause computing device B 130 (or media server 110) to generate an obscured version of the second media content item based on the unobscured version. The user of computing device B 130 can choose to send the unobscured and obscured versions of the second media content item back to computing device A 120 (e.g., via media server 110). In response to sending the second media content item to computing device A 120, the interactive content exchange module 139 can enable computing device B to provide access to the unobscured version of the first media content item. The process of receiving obscured content, sending content in a subsequent response, and then receiving access to unobscured content can repeat. For example, in order for the user of computing device A 120 to view the unobscured version of the second media content item, the user of computing device A 120 has to acquire and send a third media content item to computing device B 130 (or the user of computing device B 130).

Figure 1B:
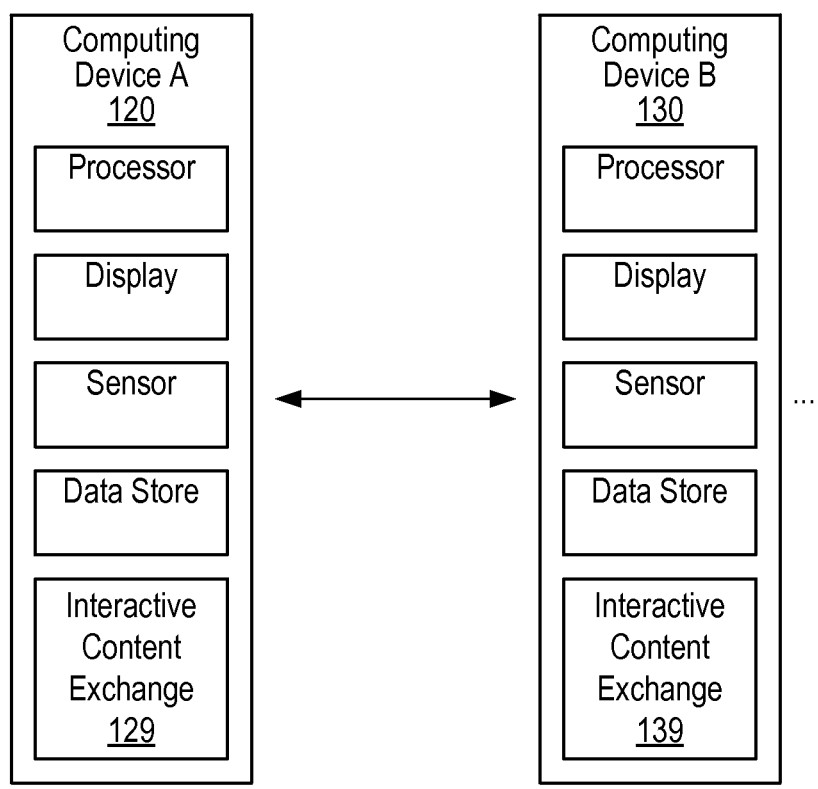
FIG. 1B illustrates an example system configured to provide for interactively exchanging media content, according to an embodiment of the present disclosure.

FIG. 1B illustrates an example system 150 configured to provide for interactively exchanging media content, according to an embodiment of the present disclosure. The example system 150 can include one or more computing devices such as computing device A 120 and computing device B 130. In some embodiments, multiple computing devices can be configured to communicate with one another. For example, as shown in FIG. 1B, computing device A 120 can communicate and exchange media content with computing device B 130 without necessarily depending on the media server 110 of FIG. 1A to relay information.

Accordingly, in some embodiments, the media server 110 of FIG. 1A can be optional. In one example scenario, the interactive content exchange component 129 can cause computing device A 120 to capture an original image, which can be at full-resolution and can be substantially clear. The interactive content exchange component 129 can cause computing device A 120 to apply one or more obscuring techniques to the original image to produce an obscured (e.g., pixelated, shrunken, etc.) version of the image. The interactive content exchange component 129 can further cause computing device A 120 to send the unobscured and obscured versions of the image to computing device B 130. Upon receipt of the unobscured and obscured versions of the image by computing device B, the interactive content exchange component 139 can cause computing device B 130 to provide access only to the obscured version of the image. In order to access the unobscured version of the image, computing device B 130 has to further acquire another image, obscure the other image, and transmit the unobscured and obscured versions of the other image back to computing device A 120. This process can repeat over time, resulting in a plurality of media content items being interactively exchanged in a "pay-to-play" manner.

Figure 2:
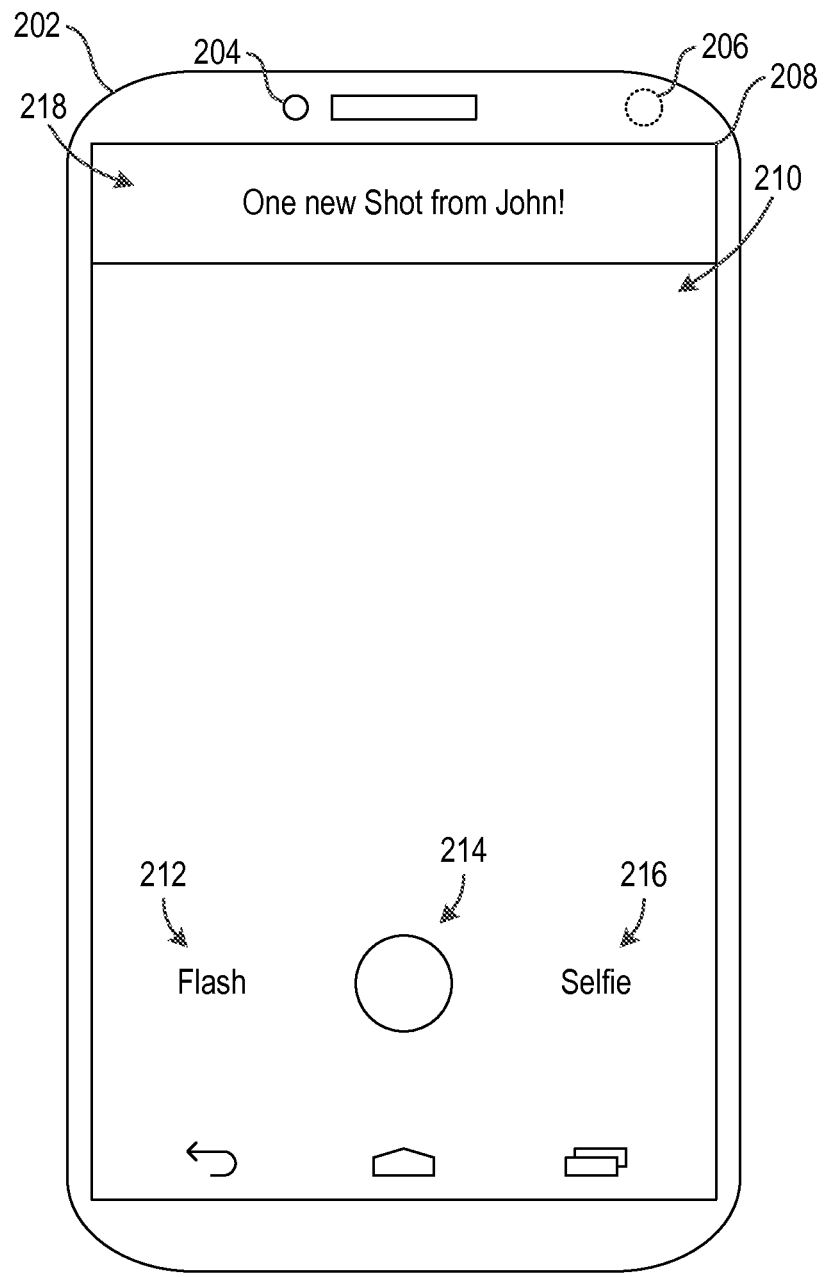
FIG. 2 illustrates an example computing device configured to provide for interactively exchanging media content, according to an embodiment of the present disclosure.

FIG. 2 illustrates an example computing device 202 configured to provide for interactively exchanging media content, according to an embodiment of the present disclosure. The example computing device 202 (e.g., computer system 1000 in FIG. 10) can comprise one or more sensors, such as a front-facing image sensor (e.g., front-facing camera) 204 and a rear-facing image sensor (e.g., rear-facing camera) 206. The example computing device 202 can also comprise a display element (e.g., display screen, touch screen, etc.) 208 configured to present visual content.

In some embodiments, the computing device 202 can be configured to run an interactive content exchange application. In some cases, the interactive content exchange application can be associated with an interactive content exchange component (e.g., interactive content exchange module 129 or interactive content exchange module 139 in FIG. 1A and FIG. 1B). In one example, the interactive content exchange application can initiate a camera mode. The camera mode can provide a view 210 of whatever imagery a selected camera (e.g., front-facing camera 204, rear-facing camera 206, etc.) currently "sees" or detects.

As shown in FIG. 2, the camera mode of the interactive content exchange application can provide various user interface elements including (but not limited to) an icon (or button) 212 for configuring flash, an icon 214 for recording, and an icon 216 for switching cameras. In some cases, the icon (or button) 212 for configuring flash can correspond to a text icon including the text "Flash". The icon 214 for recording can start and stop the recording of images or videos. In some cases, the icon 216 for switching cameras can correspond to a text icon including the text "Selfie", which can be a term that refers to a picture of oneself. In some implementations, pressing, tapping, or otherwise interacting with the "Selfie" icon or button 216 can switch the camera that is in currently use, for example, from the rear-facing camera 206 to the front-facing camera 204.

In one example, when a communication including an obscured media content item is received from another computing device, a notification 218 can be presented by the interactive content exchange application. In FIG. 2, the notification 218 can indicate that the communication, which can also be referred to as a "Shot", is received from a user named "Joe". In some cases, the notification 218 can be presented when both the obscured version and the unobscured version of the media content item have been received (e.g., completely downloaded). Continuing with the example, a user of the computing device 202 can tap on, click on, or otherwise interact with the notification 218 and/or device 202 in order to obtain more information about the communication (e.g., "Shot") from "Joe".

Figure 3:
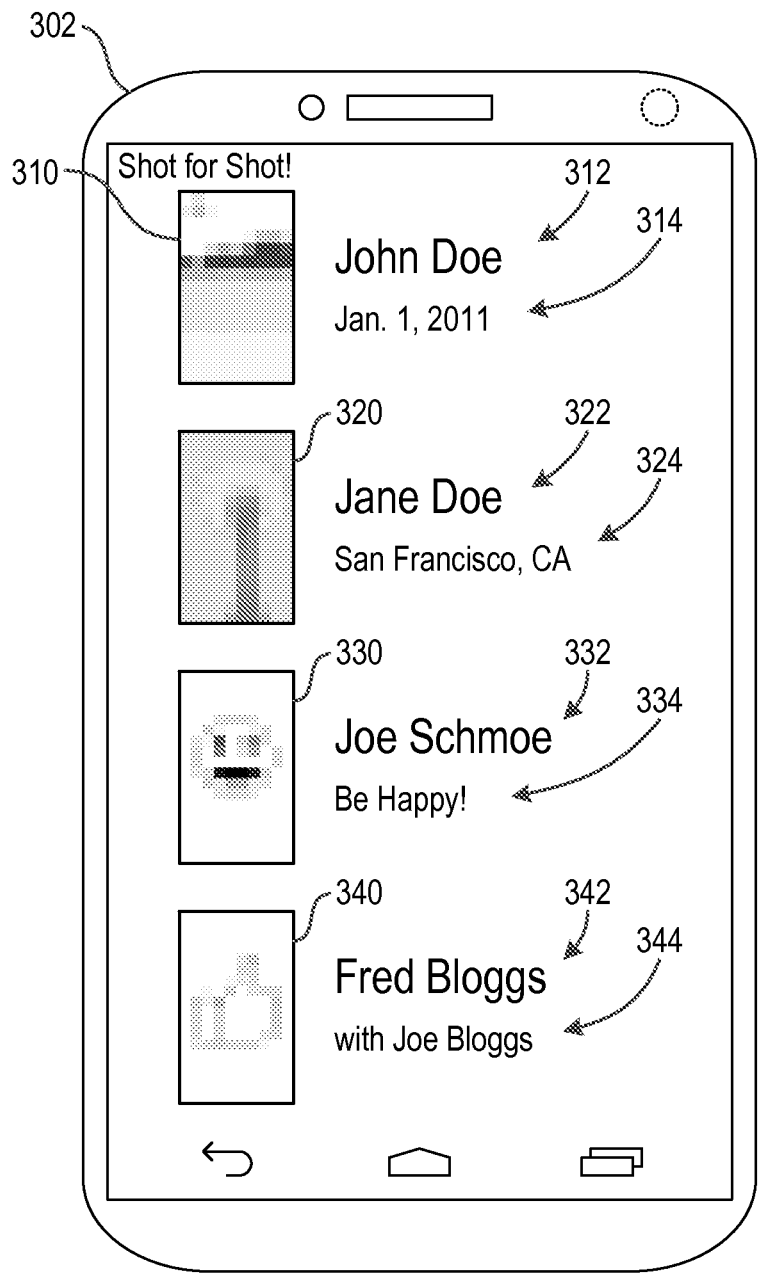
FIG. 3 illustrates an example computing device configured to provide for interactively exchanging media content, according to an embodiment of the present disclosure.

FIG. 3 illustrates an example computing device 302 (e.g., computer system 1000 in FIG. 10) configured to provide for interactively exchanging media content, according to an embodiment of the present disclosure. As discussed above with reference to FIG. 2, a user can interact with a notification, which indicates that a communication (e.g., "Shot") has been received, in order to obtain more information about the received communication. In FIG. 3, when the user interacts with the notification, the interactive content exchange application can display one or more received communications that have yet to be completely accessed by the user. These one or more received communications are not yet permitted to be completely accessible. These one or more received communications can, for example, include obscured versions of media content items that are accessible (e.g., viewable, displayable), as well as unobscured versions of the media content items that are not yet accessible. In some instances, these one or more received communications can be referred to as "outstanding Shots" or "new Shots".

In the example of FIG. 3, four outstanding Shots are shown. The outstanding Shots can, for example, be displayed or listed from most recently received to least recently received (or vice versa). In this example, the first outstanding Shot can include an obscured (e.g., pixelated) version 310 of a first media content item (e.g., image, video, etc.) received from John Doe 312. The first outstanding Shot can also be associated with metadata such as a date (or time) 314 when the first media content item (and/or the first outstanding Shot) was created.

The second outstanding Shot can include an obscured version 320 of a second media content item received from (or sent by) Jane Doe 322. The second outstanding Shot can include information indicating that the second media content item (and/or the second outstanding Shot) was created in a certain location (e.g., San Francisco, Calif. 324).

Continuing with the example of FIG. 3, the third outstanding Shot can include an obscured version 330 of a third media content item received from Joe Schmoe 332 and a caption (e.g., "Be Happy!" 334). Furthermore, the fourth outstanding Shot can include an obscured version 340 of a fourth media content item received from Fred Bloggs 342 and a tag 344 indicating that the fourth media content item (and/or the fourth outstanding Shot) is associated with Joe Bloggs.

In some embodiments, a Shot can be associated with other information including (but not limited to) a property, an identifier for a sending computing device that sent the Shot, a speed at which the sending computing device was moving or being moved when the Shot was created, an acceleration at which the sending computing device was undergoing when the Shot was created, a direction at which the sending computing device was pointing when the Shot was created, the weather conditions surrounding the sending computing device when the Shot was created, and/or a title of a media being accessed (e.g., a song being played) by the sending computing device when the Shot was created, etc.

As discussed above, the four outstanding Shots are not yet completely accessible. In other words, the user of the computing device 302 (or the interactive content exchange application running on the computing device 302) can only access or view the obscured (e.g., pixelated, shrunken, thumbnail, etc.) versions of the media content items of the outstanding Shots and cannot yet access the unobscured (e.g., unpixelated, enlarged, full-resolution, original, etc.) versions of the media content items. The obscured versions of the media content items can be intended to spark the user's interest in the media content items (e.g., such that the user would want to view the unobscured versions of the media content items). In order to access the unobscured versions, the user must create his or her own media content item(s) to be transmitted to the respective senders of the outstanding Shots.

Figure 4:
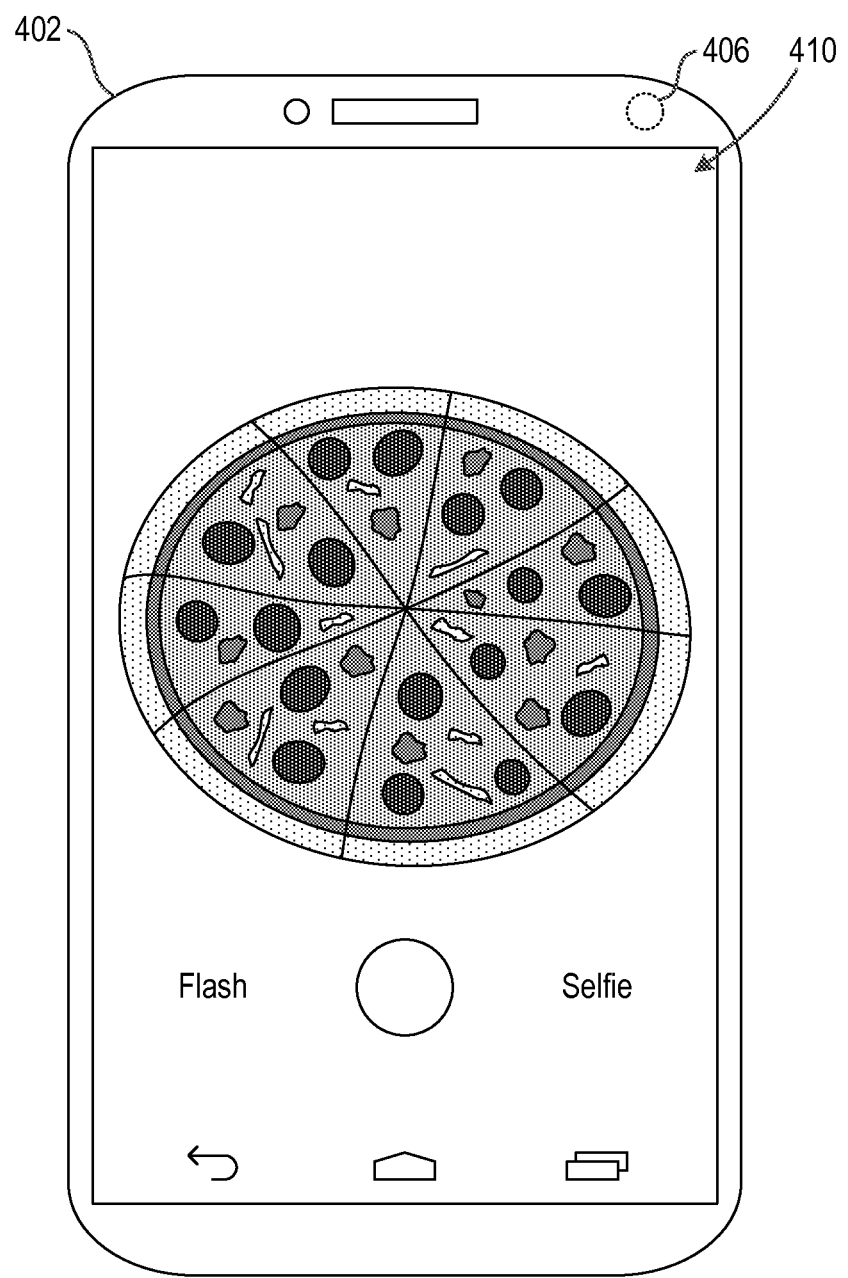
FIG. 4 illustrates an example computing device configured to provide for interactively exchanging media content, according to an embodiment of the present disclosure.

FIG. 4 illustrates an example computing device 402 (e.g., computer system 1000 in FIG. 10) configured to provide for interactively exchanging media content, according to an embodiment of the present disclosure. As discussed previously, in accordance with the "pay-to-play" approach to communications, in order to access (e.g., view, play, etc.) unobscured versions of media content items included in received communications (e.g., Shots), a user must produce or create his or her own media content item(s) to be transmitted to the respective senders of the received communications. As such, in order to access the unobscured versions of the media content items included with the outstanding Shots (as described with reference to FIG. 3), the user can activate the camera mode of the interactive content exchange application. The camera mode of the interactive content exchange application can enable the user to create his or her own media content item(s) to be transmitted to those who sent the outstanding Shots.

As shown in the example of FIG. 4, the computing device 402 running the interactive content exchange application can be operating in the camera mode. In this example, the user can be currently at a pizza eatery. The user can decide to create a media content item in the form of an image of a pizza. Using, for example, the rear-facing camera 406 on the computing device 402, the user can capture the image 410 of the pizza. The captured image 410 can correspond to an unobscured (e.g., full-resolution, unaltered, original, etc.) version of the image. In some embodiments, the computing device 402 can generate an obscured version of the image 410 based on the unobscured version. In some embodiments, the computing device 402 can provide the unobscured version to a remote server (e.g., media server 110 in FIG. 1A), where the obscured version can be generated based on the unobscured version.

Figure 5:
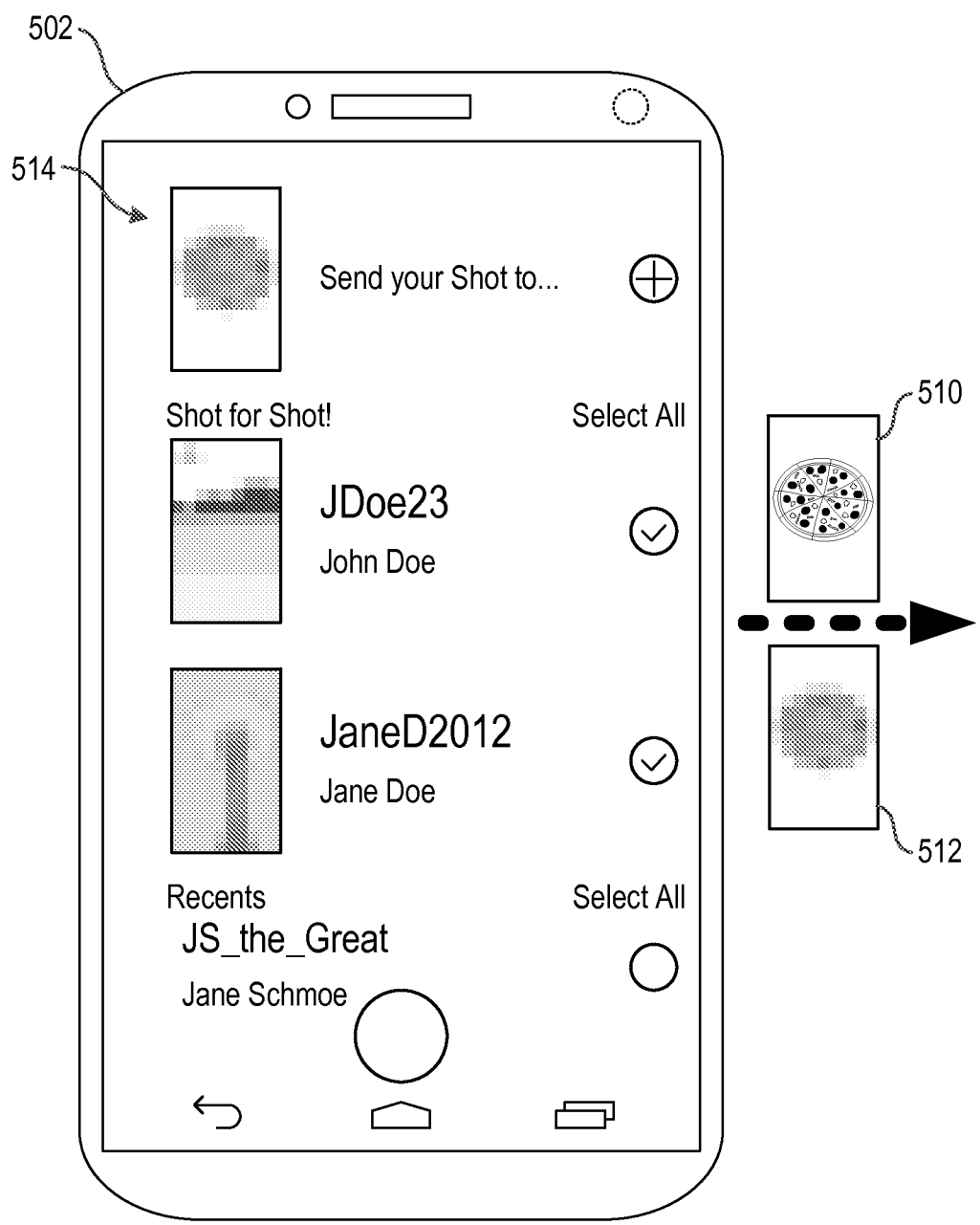
FIG. 5 illustrates an example computing device configured to provide for interactively exchanging media content, according to an embodiment of the present disclosure.

FIG. 5 illustrates an example computing device 502 (e.g., computer system 1000 in FIG. 10) configured to provide for interactively exchanging media content, according to an embodiment of the present disclosure. Subsequent to acquiring (e.g., capturing) an unobscured version 510 of a media content item (e.g., full-resolution image 410 of pizza in FIG. 4), a user can select one or more recipients to whom to send a Shot 514, which can include the unobscured version 510 of the media content item as well as an obscured version 512 of the media content item. Again, the obscured version 512 can be generated based on applying one or more obscuring techniques (e.g., a pixilation algorithm) to the unobscured version 510.

As shown in the example of FIG. 5, the user of the computing device 502 can select recipients to whom to send the user's Shot 514. In some instances, the user might desire to gain full access to the outstanding Shots (e.g., access the unobscured versions of the media content items included with the outstanding Shots). Accordingly, the user can select to transmit his/her Shot 514 to those who sent the outstanding Shots to the user, such as John Doe and Jane Doe. In some instances, the user might desire to start or resume conversations with other contacts. As shown in the example of FIG. 5, there can be a Recents list including contacts with whom to potentially engage in conversations. The contacts can, for example, be listed in an order starting with those from whom the user of the computing device 502 had most recently received content to those from whom the user had least recently received content (or vice versa). Moreover, in some cases, the contacts can be listed based on when the user transmitted content to them.

In the example of FIG. 5, the user of the computing device 502 desires to view the unobscured versions of the media content items included with the outstanding Shots sent by John Doe and Jane Doe. As such, in this example, the user can select the recipients of his/her Shot 514 to include John Doe and Jane Doe. Upon sending the Shot 514, the user can immediately (or within an allowable time period) gain access to the unobscured versions of the media content items included with the Shots sent by John Doe and Jane Doe (see FIG. 6 and FIG. 7).

Similarly, John Doe and Jane Doe can each receive the user's Shot 514 and can access the obscured version 512 of the included media content item but not yet the unobscured version 510. In order for each of John Doe and Jane Doe to access the unobscured version 510, each must transmit another Shot back to the user. The process can repeat, resulting in users exchanging Shots for Shots.

Figure 6:
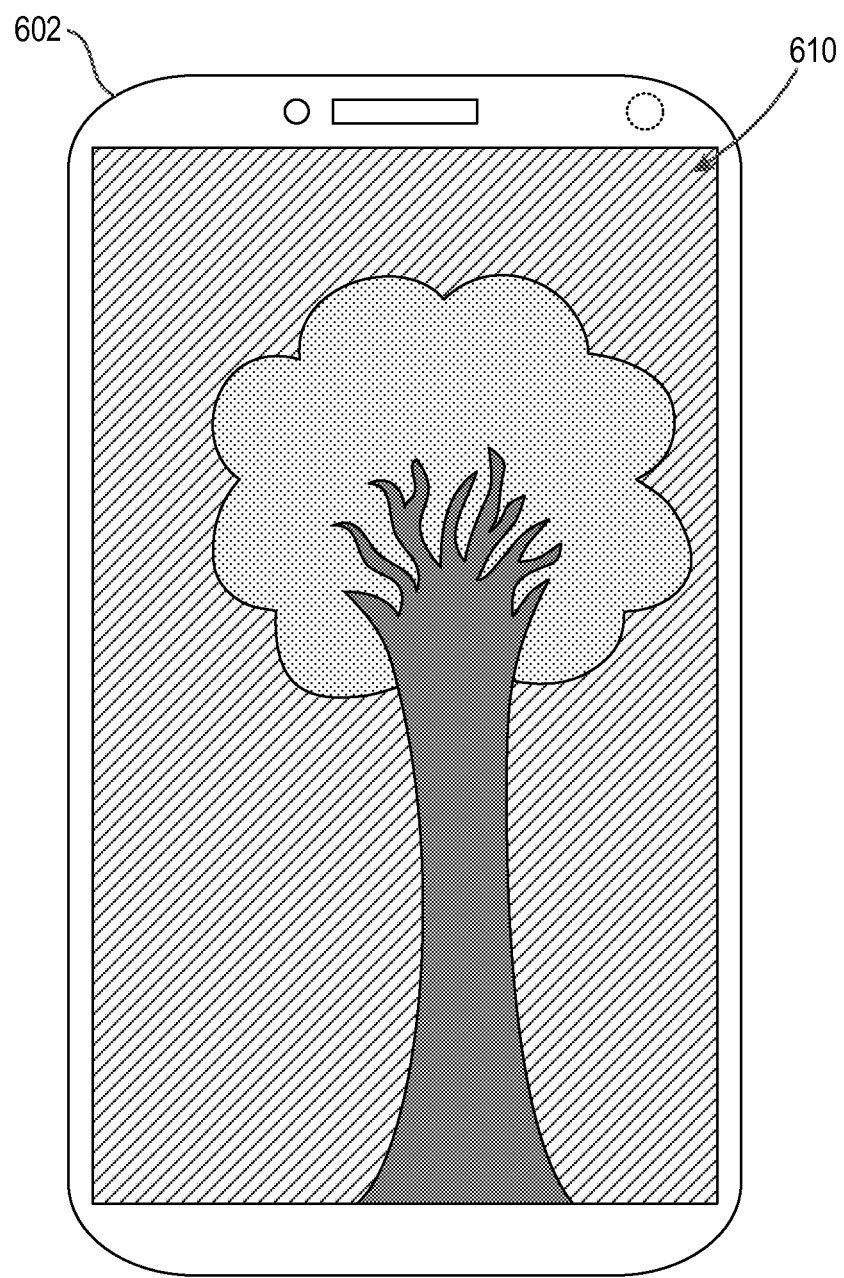
FIG. 6 illustrates an example computing device configured to provide for interactively exchanging media content, according to an embodiment of the present disclosure.

FIG. 6 illustrates an example computing device 602 (e.g., computer system 1000 in FIG. 10) configured to provide for interactively exchanging media content, according to an embodiment of the present disclosure. In the example of FIG. 6, a user of a computing device 602 has sent a Shot (e.g., Shot 514 in FIG. 5) to other users, such as John Doe and Jane Doe, who had previously sent the user a first Shot (e.g., the first outstanding Shot in FIG. 3) and a second Shot (e.g., the second outstanding Shot in FIG. 3). As such, the computing device 602 (or the interactive content exchange application running on the device 602) can immediately, or within an allowable time period, provide the user with access to unobscured versions of media content items included with the first Shot from John Doe and with the second Shot from Jane Doe. In the example of FIG. 6, access to the unobscured versions can be sorted from least recently received to most recently received. As such, between the first Shot and the second Shot, the user can first be provided with access to the unobscured (e.g., full-resolution, unpixelated, etc.) version of the media content item included with the second Shot (e.g., the second outstanding Shot in FIG. 3) from Jane Doe.

Figure 7:
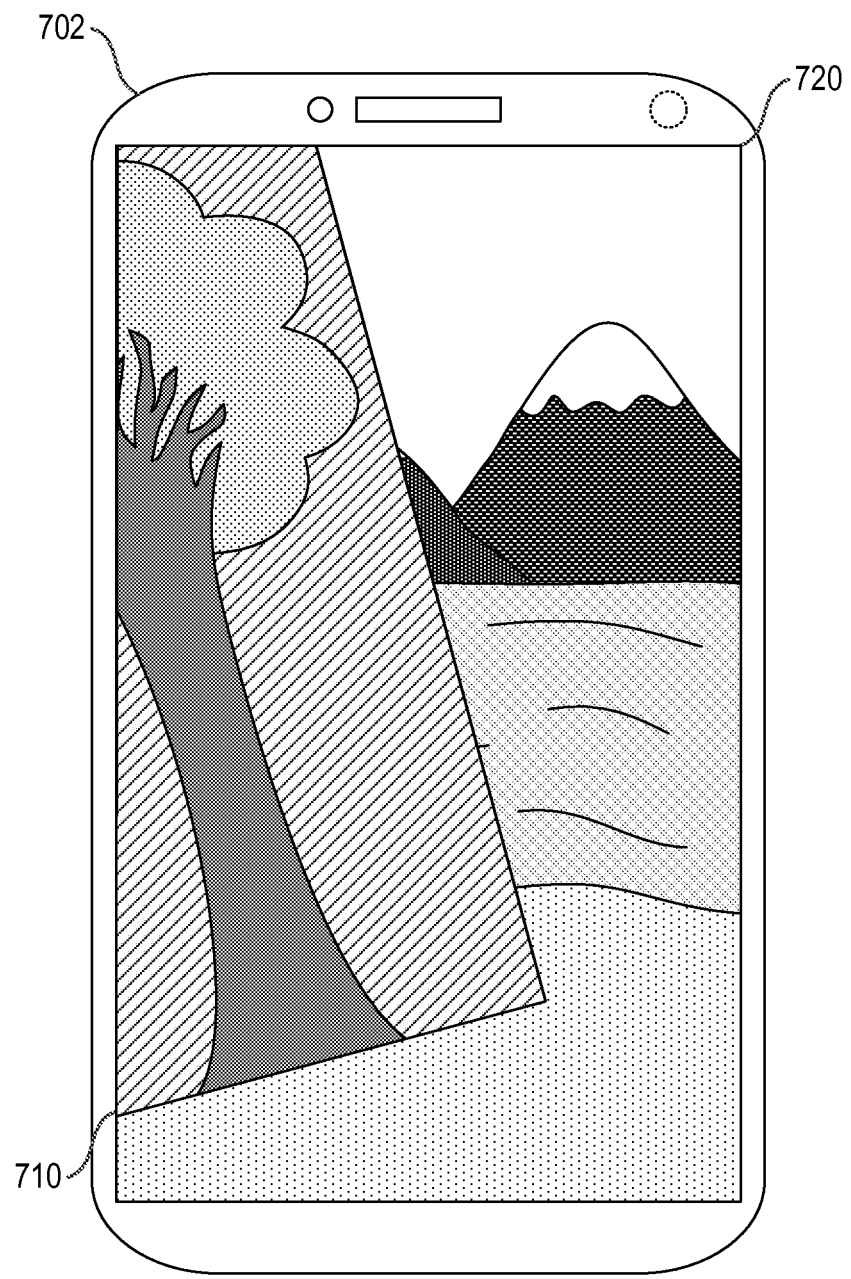
FIG. 7 illustrates an example computing device configured to provide for interactively exchanging media content, according to an embodiment of the present disclosure.

FIG. 7 illustrates an example computing device 702 (e.g., computer system 1000 in FIG. 10) configured to provide for interactively exchanging media content, according to an embodiment of the present disclosure. In some embodiments, when access to unobscured versions of multiple content items is provided, the multiple unobscured versions can be ordered, for example, from least recently received to most recently received (or vice versa). In some embodiments, the multiple unobscured versions can be presented in a virtual stack. For example, each unobscured version of a respective media content item can be presented as a displayed representation in a respective (virtual) layer of the virtual stack.

As discussed above, a user can gain access to unobscured versions of media content items included with a first Shot from John Doe and a second Shot from Jane Doe. In the example of FIG. 7, the unobscured version 710 of the media content item (e.g., image of tree) from Jane Doe can be presented as a displayed representation in a first (upper) layer of a virtual stack, while the unobscured version 720 of the media content item (e.g., image of scenery) from John Doe can be presented as a displayed representation in a second (lower) layer of the virtual stack.

Continuing with the example, the computing device 702 (or the interactive content exchange application running on the computing device 702) can receive a user interaction to move the displayed representation of the unobscured version 710 from Jane Doe. The user interaction can cause the displayed representation of the unobscured version 710 to move based on one or more movements associated with the user interaction (e.g., touch-based dragging). As shown in FIG. 7, when the displayed representation of the unobscured version 710 is moved, a displayed representation of the unobscured version 720 from John Doe can be revealed in the (virtual) layer below.

Furthermore, in some implementations, the one or more movements can be associated with at least one of a flicking gesture, a swiping gesture, a throwing gesture, or a tossing gesture. In some cases, the displayed representation of Jane Doe's unobscured version 710 in the first layer can be moved off the display screen of the computing device 702, and an instance of Jane Doe's unobscured version 710 can be permanently removed from the computing device 702 (e.g., the second Shot from Jane Doe is no longer considered outstanding and can be deleted). Further, the displayed representation of the unobscured version 720 from John Doe can be presented on the display screen in full view. Accordingly, in some embodiments, an unobscured version in the next layer of the virtual stack can only be accessible in full view when the unobscured version in the current (e.g., topmost) layer is swiped away or removed (which can result in a permanent deletion of the associated Shot).

In some embodiments, there can be one or more animations for a displayed representation of an unobscured version of a media content item when being swiped away or removed. In some embodiments, after the user swipes away all accessible or available unobscured versions of media content items in the virtual stack, the computing device 702 can provide the camera mode (e.g., including a view of whatever imagery the camera currently "sees" or detects).

Again, it should be understood that, in some embodiments, the order of unobscured versions to be presented in the virtual stack can be changed, switched, and/or reversed (e.g., most recently received on the top of the virtual stack and least recently received on the bottom of the virtual stack).

Figure 8A:
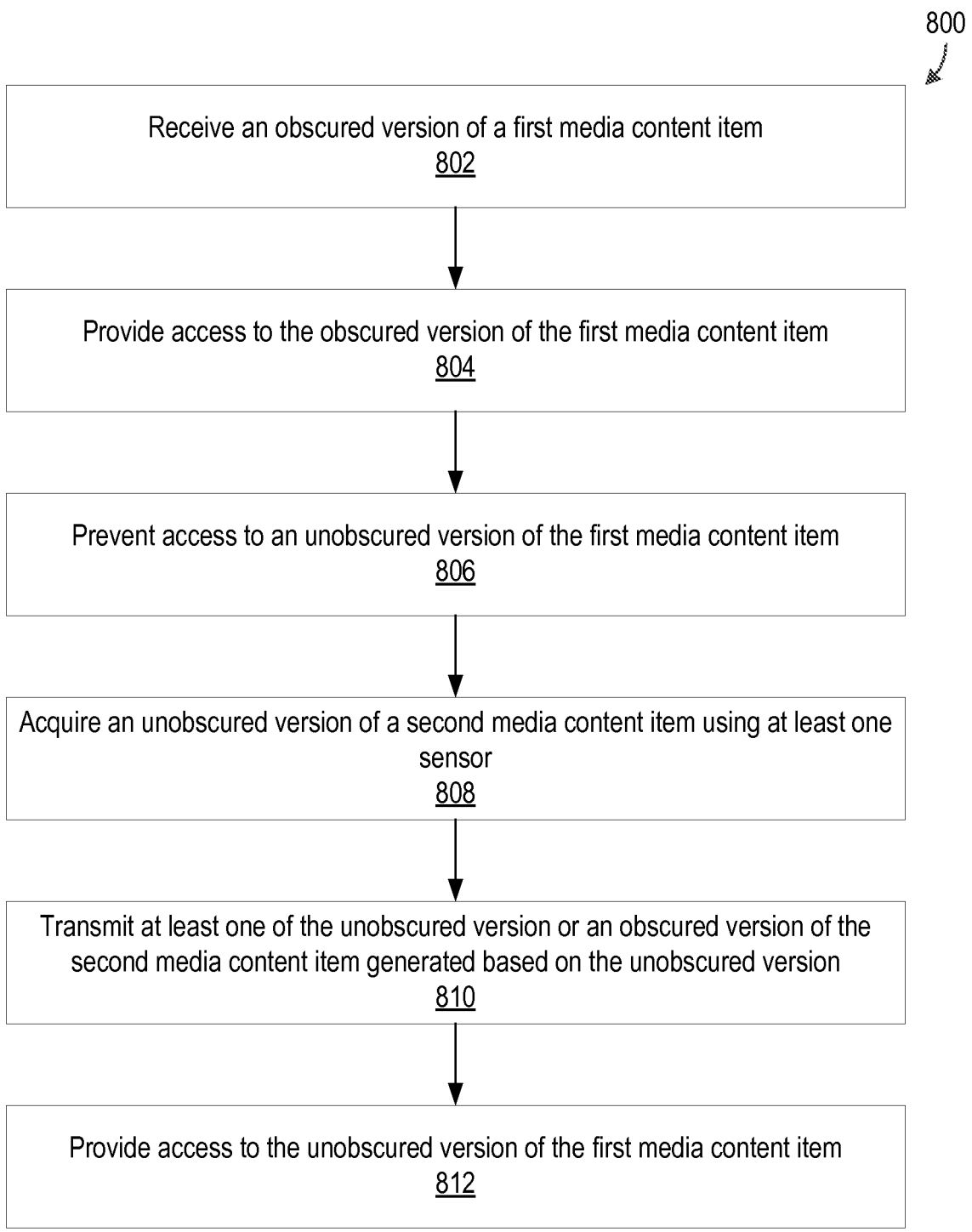
FIG. 8A illustrates an example method for interactively exchanging media content, according to an embodiment of the present disclosure.

FIG. 8A illustrates an example method 800 for interactively exchanging media content, according to an embodiment of the present disclosure. It should be appreciated that there can be additional, fewer, or alternative steps performed in similar or alternative orders, or in parallel, within the scope of the various embodiments unless otherwise stated.

At step 802, the example method 800 can receive, by a first computing system (or device), an obscured version of a first media content item from a second computing system. Step 804 can include providing, by the first computing system, access to the obscured version of the first media content item.

Step 806 can include preventing, by the first computing system, access to an unobscured version of the first media content item. At step 808, an unobscured version of a second media content item can be acquired, by the first computing system, using at least one sensor of the first computing system.

Step 810 can include transmitting to the second computing system, by the first computing system, at least one of the unobscured version of the second media content item or an obscured version of the second media content item generated based on the unobscured version of the second media content item. In some implementations, the obscured version of the second media content item can be generated by the first computing system, the second computing system, a media server, etc., and/or any combination thereof. In some instances, the obscured version of the second media content item can be transmitted first and the unobscured version of the second media content item can be transmitted at a subsequent time. In some cases, the first computing system can transmit just the unobscured version of the second media content item, such that the media server and/or the second computing system can generate the obscured version of the second media content item based on the unobscured version of the second media content item.

Step 812 can include providing, by the first computing system, access to the unobscured version of the first media content item. In some embodiments, providing access to the unobscured version of the first media content item can include presenting the unobscured version of the first media content item over time. For example, if the first media content item corresponds to a video, then the video can be played continuously such as in a playback loop or repeated manner (e.g., until swiped away, removed, device screen-lock enabled, and/or device screen-saver enabled, etc.).

FIG. 8B illustrates an example method 850 for interactively exchanging media content, according to an embodiment of the present disclosure. Again, it should be appreciated that there can be additional, fewer, or alternative steps performed in similar or alternative orders, or in parallel, within the scope of the various embodiments unless otherwise stated.

The example method 850 can receive, by the first computing system, an obscured version of a third media content item from a third computing system prior to transmitting the obscured version of the second media content item to the second computing system, at step 852. Step 854 can include providing, by the first computing system, access to the obscured version of the third media content item.

The first computing system can prevent access to an unobscured version of the third media content item, at step 856. At step 858, the first computing system can transmit to the third computing system at least one of the unobscured version of the second media content item or the obscured version of the second media content item. Step 860 can include providing access to the unobscured version of the third media content item within an allowable time period from when the at least one of the unobscured version of the second media content item or the obscured version of the second media content item is transmitted to the third computing system.

Various other embodiments, implementations, utilizations, and/or applications associated with interactively exchanging media content can be possible. In some instances, media content can be interactively exchanged in a "round robin" manner. In one example, a "round robin" group can include User A, User B, and User C. User A can send a first Shot to User B. In order for User B to fully access the first Shot (e.g., view the unobscured media content item included with the first Shot), User B can send a second Shot to User C. In order for User C to fully access the second Shot, User C can send a third Shot to User A, and so forth.

In some embodiments, media content can be interactively exchanged among groups. For example, a first group can be associated with a first set of computing systems and a second group can be associated with a second set of computing systems. In this example, one or more members of the first group can send a first Shot(s) to one or more members of the second group. All members of the second group can fully access the first Shot(s) when at least one member of the second group sends a second Shot(s) back to at least one member of the first group. In some cases, the first and second groups can correspond to different families, corporations, or organizations.

In some implementations, if a first user receives multiple Shots from a second user, the first user can fully access the multiple Shots when the first user sends at least one Shot back to the second user. In some instances, if the first users receives Shots from multiple users, then the first user can fully access the Shots when the first user sends at least one Shot back to the multiple users.

In some embodiments, the user can create an account to utilize the interactive content exchange component. In one example, the user can create the account using a phone number, a name, a username, etc., and/or any combination thereof. In another example, the user can create the account based on an existing account with a third party entity (e.g., a social networking service, a social media service, a forum service, etc.). In some implementations, there can be an authentication or verification step based on a SMS communication.

In some embodiments, a first user can transmit or receive Shots to and from at least one second user not currently included in the first user's contact list or address book. In one example, the first user can exchange Shots with the general public. In another example, the first user can exchange Shots with a machine-selected (e.g., random) user.

In some embodiments, the user can manage saving features for Shots transmitted and/or received. For example, the user can elect to only save Shots that he or she transmits.

In some cases, various embodiments of the present disclosure can be implemented as software, hardware, and/or any combination thereof. For example, various embodiments of the present disclosure can be implemented in association with one or more applications to be installed and run on one or more computing devices (and/or systems).

It is further contemplated that there can be many other uses, applications, implementations, and/or variations associated with the various embodiments of the present disclosure.

Providing Responses to Media Content

Figure 9:
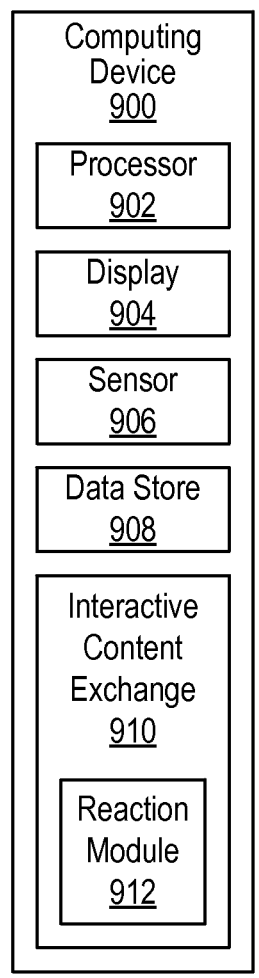
FIG. 9 illustrates an example computing device configured to facilitate providing responses to exchanged media content, according to an embodiment of the present disclosure.

FIG. 9 illustrates an example computing device 900 configured to facilitate providing responses to exchanged media content, according to an embodiment of the present disclosure. The computing device 900 can, for example, correspond to Computing Device A 120 or Computing Device B 130 of FIG. 1A and FIG. 1B. The example computing device 900 can include at least one processor 902, at least one display element 904, at least one sensor 906, and at least one data store 908. The at least one processor 902 can facilitate various operations or tasks associated with interactively exchanging media content, such as tasks related to providing responses (e.g., reactions, replies, feedback, etc.) to exchanged content. The display element 904 can be configured to display or present visual content. The sensor 906 can be configured to acquire, gather, determine, detect, and/or sense data. In some cases, the sensor 906 can include, but is not limited to, at least one of a touch sensor (e.g., touch display, touch screen), an audio sensor (e.g., microphone), an image sensor (e.g., camera), an accelerometer, a gyroscope, a locational sensor (e.g., GPS), etc. Moreover, the data store 908 can be configured to store information associated with various operations or tasks of the computing device 900.

As discussed previously, a computing device can include an interactive content exchange module. In the example of FIG. 9, an interactive content exchange module 910 of the computing device 900 can include a reaction module 912. The reaction module 912 can be configured to provide a response, such as a "Reaction," to exchanged media content.

In one example, the computing device 900 or a user of the computing device 900 can receive a Shot from another computing device or another user of the other computing device. The user who received the Shot can desire to provide a "Reaction" to the received Shot. A "Reaction" can refer to content that is provided in response to, in reply to, as feedback to, and/or as a reaction to the received content (i.e., the received Shot). A "Reaction" can include one or more types of media content, such as images, videos, and/or text, etc.

In some implementations, the exchange of Reactions is not implemented in a "pay-to-play" approach. In the previous example, if the user who received the Shot provides a Reaction to the original sender of the Shot, then the original sender of the Shot can access or view the Reaction without having to provide content in return, such as another Shot or another Reaction. In some implementations, the exchange of Reactions may be implemented in a "pay-to-play" approach. For example, if the user who received the Shot provides a Reaction to the original sender of the Shot, then the original sender of the Shot can access or view the Reaction only after providing content in return, such as another Shot or another Reaction.

Figure 10:
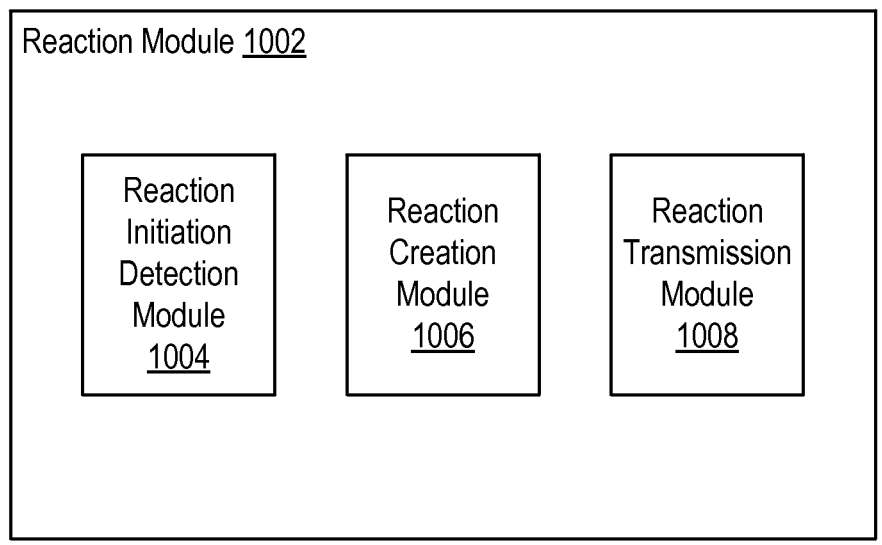
FIG. 10 illustrates an example reaction module configured to facilitate providing responses to exchanged media content, according to an embodiment of the present disclosure.

FIG. 10 illustrates an example reaction module 1002 configured to facilitate providing responses to exchanged media content, according to an embodiment of the present disclosure. The reaction module 1002 can correspond to the reaction module 912 of FIG. 9. The reaction module 1002 can be included in an interactive media content exchange module or component of a computing device (e.g., interactive media content exchange module 910 of computing device 900 in FIG. 9). As shown in FIG. 10, the reaction module 1002 can, for example, include a reaction initiation detection module 1004, a reaction creation module 1006, and a reaction transmission module 1008.

The reaction initiation detection module 1004 can be configured to detect a command or instruction, such as from a user of the computing device, to initiate a Reaction. In one example, the reaction initiation detection module 1004 can recognize that a Shot is being accessed or viewed by the user. While the Shot is being accessed or viewed by the user, the user can tap on the Shot in order to initiate the Reaction. Accordingly, in some embodiments, the reaction initiation detection module 1004 can work in conjunction with a touch sensor (e.g., touch screen) of the computing device to detect the tap or other similar interaction performed by the user. Upon detecting the initiation of the Reaction, the reaction module 1004 can proceed to create (or generate, produce, assemble, etc.) the Reaction.

The reaction creation module 1006 can be configured to facilitate creating Reactions. Continuing with the previous example, subsequent to the initiation of the Reaction being detected, the reaction creation module 1006 can cause a display element (e.g., display 904 in FIG. 9), which is displaying the Shot being viewed by the user, to additionally display a camera view of a camera or image sensor (e.g., sensor 906 in FIG. 9) of the computing device. For example, the reaction creation module 1006 can cause an upper portion of the display element to display the Shot and a lower portion of the display element to display the camera view. Other variations in the manner of displaying the Shot and the camera view are possible. In some implementations, the camera view can initially or by default present a front-facing camera view. In some cases, there can be an option to switch to a rear-facing image sensor or camera view.

The reaction creation module 1006 can receive one or more commands or instructions to generate the Reaction. In one example, the user can tap on a "React" button to cause the camera to capture an image corresponding to the camera view. In some cases, the Reaction in the form of the image can be transmitted, by the reaction transmission module 1008, to the original sender of the Shot subsequent to the user's tap of the "React" button. In another example, the user can press and hold the "React" button to cause the camera to record a video of whatever is shown in the camera view. When the user releases the press and hold of the "React" button, the video recording can end and the video Reaction can be transmitted, by the reaction transmission module 1008, back to the sender of the Shot.

In a further example, the Reaction can include text. The user can tap on an area within the Reaction camera view but outside the "React" button. This can cause a text prompt to be provided. The user can input text to be included in the Reaction. In some implementations, when the user taps on the area within the Reaction camera view but outside the "React" button, the reaction creation module 1006 causes the camera view to be captured as an image and transparently fills the image with a random solid color. The text is then inputted over the transparently color-filled image. Moreover, in some embodiments, one or more emoticons or other graphical icons can be selected to be included in the Reaction as well. Upon inputting the text and/or icons, the Reaction can be created and sent, by the reaction transmission module 1008, to the sender of the Shot.

In addition, in some cases, if the user taps on the displayed Shot (e.g., the upper portion of the display element) before sending the Reaction, then the Shot can be fully displayed again and the Reaction can be canceled. In some implementations, the Reaction can be transmitted, by the reaction transmission module 1008, in conjunction with the Shot back to the original sender of the Shot. Furthermore, in some instances, if it is determined that the original sender of the Shot still has access to the Shot, then only the Reaction needs to be transmitted to the sender.

In some embodiments, for the original sender of the Shot to access the Reaction, the sender can tap on the Shot to cause the Reaction to appear (e.g., on a lower portion of a split display). The sender can then tap again on the Shot (e.g., on an upper portion of the split display) to cause the Reaction to disappear. In some cases, when the sender discards the Shot, then the Reaction can be discarded as well. It is contemplated that numerous variations are also possible. For example, in some embodiments, when a Reaction or a camera view for capturing/recording the Reaction is displayed in a second (e.g., lower) portion of a split display, the original Shot can be shrunken in size, cropped, and/or otherwise modified to be displayed in a first (e.g., upper) portion of the split display.

Figure 11:
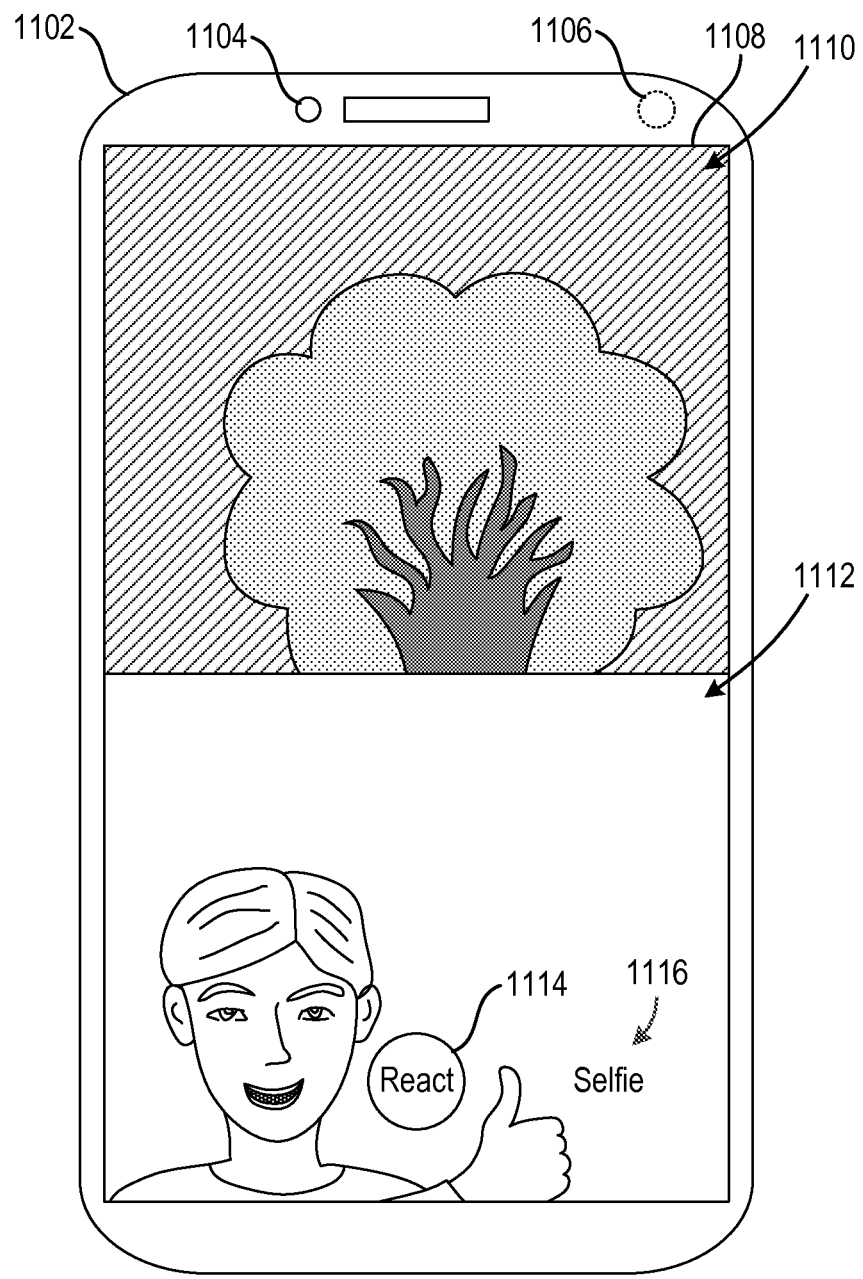
FIG. 11 illustrates an example computing device configured to facilitate providing responses to exchanged media content, according to an embodiment of the present disclosure.

FIG. 11 illustrates an example computing device 1102 configured to facilitate providing responses to exchanged media content, according to an embodiment of the present disclosure. As shown in FIG. 11, the computing device 1102 can, for example, include a front-facing camera 1104, a rear-facing camera 1106, and a display element and/or touch sensor (e.g., touch screen) 1108.

In the example of FIG. 11, the computing device 1102 or a user (i.e., recipient user) of the computing device 1102 can receive a Shot 1110 from another user (i.e., sending user). Details associated with interactively exchanging media content, such as Shots, are discussed previously.

Continuing with the example, the recipient user can decide to provide a response or a "Reaction" to the received Shot 1110. In some embodiments, the recipient user can tap on the Shot 1110 displayed via the touch screen 1108 to initiate the creation of the Reaction. Subsequent to detecting the Reaction initiation, the touch screen 1108 can split the display, present the Shot 1110 in an upper portion of the split display, and present a camera view for the Reaction 1112 in a lower portion of the split display.

In some implementations, the camera view for the Reaction (e.g., Reaction camera view) 1112 can, by default, show the front-facing camera 1104 view. In some implementations, the Reaction camera view 1112 can be configured to show the rear-facing camera 1106 view by default. In some embodiments, there can be an option to select or switch the camera to be used, such as a "Selfie" button 1116. The "Selfie" button 1116 can, for example, activate the front-facing camera 1104 when selected and activate the rear-facing camera 1106 when deselected.

As discussed above, if the recipient user taps the "React" button 1114, the computing device 1102 can capture an image corresponding to whatever is shown in the camera view and can start transmitting the image as a Reaction (i.e., the Reaction image, the image Reaction, etc.) back to the sending user when the tap is released. If the recipient user presses and holds the "React" button 1114, the computing device 1102 can start recording a video. When the recipient releases the press and hold of the "React" button, the video recording can stop and the video can be transmitted as a Reaction (i.e., the Reaction video, the video Reaction, etc.) back to the sending user. If, for example, the user taps on an area within the Reaction camera view 1112 but outside the "React" button 1114, then the recipient user can be prompted to input text, emoticons, and/or other graphics that are to be included in the Reaction.

In some embodiments, the Reaction together with the Shot are transmitted back to the sending user. In some cases, Reactions do not necessarily need to be implemented in a "pay-to-play" manner and as such, the sending user can readily access or view the Reaction sent by the recipient user.

Figure 12A:
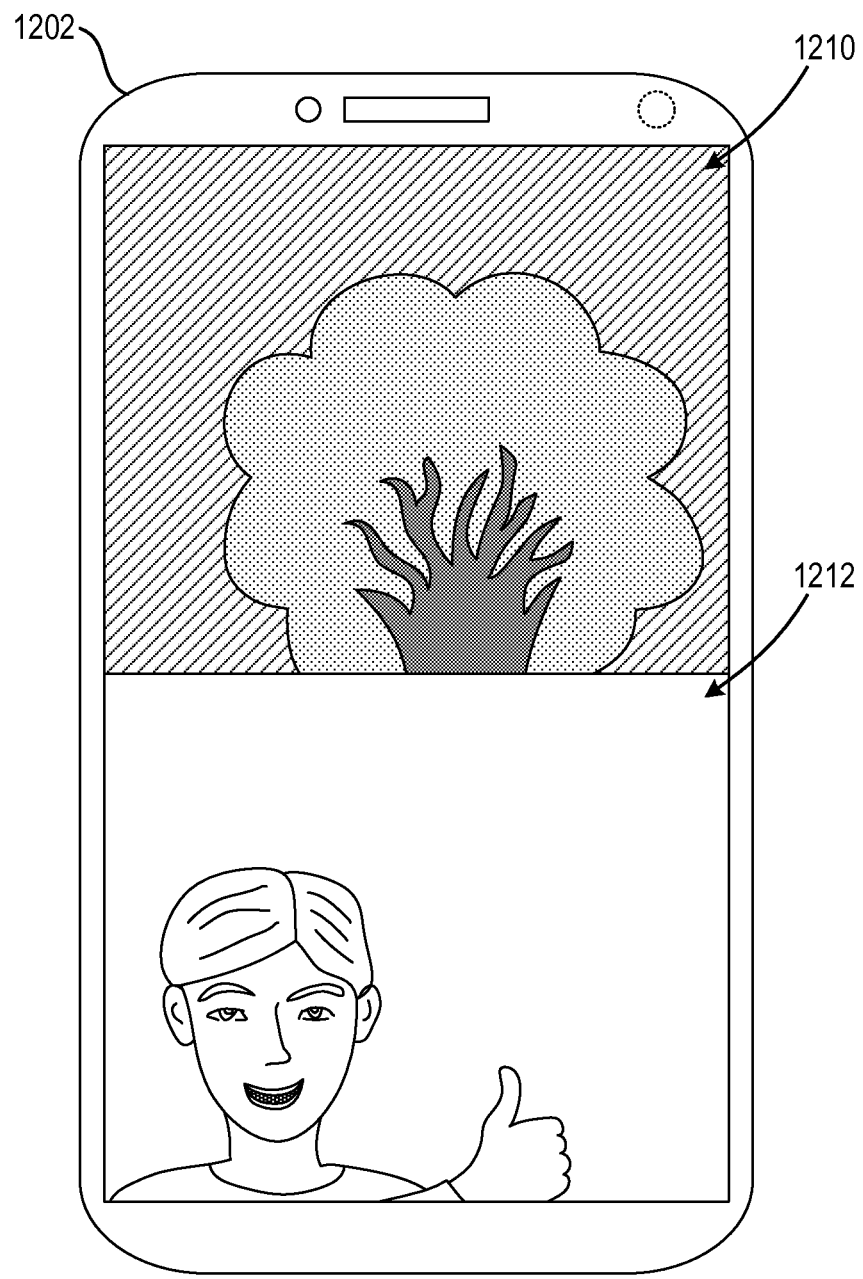
FIG. 12A illustrates an example computing device configured to access responses to exchanged media content, according to an embodiment of the present disclosure.

FIG. 12A illustrates an example computing device 1202 configured to access responses to exchanged media content, according to an embodiment of the present disclosure. The example computing device 1202 can correspond to a computing device of a sending user, who had previously sent a Shot to a recipient user. In the example of FIG. 12A, the computing device 1202 can receive a response, such as a Reaction, from the recipient user in reply to the Shot previously sent by the sending user. The Reaction 1212 can be received, by the sending user via the computing device 1202, in conjunction with the previous Shot 1210.

In some instances, when accessing or viewing the Reaction 1212 and the Shot 1210, the user can toggle between a full view of the Shot 1210 and a view of the Reaction 1212 (e.g., presented on a lower portion of a split display) by tapping on the Shot 1210.

In one example, the Shot 1210 and the Reaction 1212 are both images (and/or text). When viewing the Shot 1210 and the Reaction 1212, the Shot 1210 image/text and the Reaction 1212 image/text can both be displayed statically and indefinitely.

In another example, the Shot 1210 can be a video and the Reaction 1212 can be an image (and/or text). When viewing the Shot 1210 and the Reaction 1212, the Shot 1210 video can loop continuously and the Reaction 1212 image/text can be displayed statically and indefinitely. The audio (if any) of the Shot 1210 video can be played.

In a further example, the Shot 1210 can be an image and/or text and the Reaction 1212 can be video. When viewing the Shot 1210 and the Reaction 1212, the Shot 1210 image/text can be displayed statically and indefinitely and the Reaction 1212 video can loop continuously. The audio (if any) of the Reaction 1212 video can be played.

In a further example, the Shot 1210 and the Reaction 1212 are both videos. When viewing the Shot 1210 and the Reaction 1212, the Shot 1210 video and the Reaction 1212 video can loop continuously. In some cases, the audio of whichever content (Shot 1210 or Reaction 1212) is in focus or in view can be played. For example, if the Response 1212 video is in view, then the audio for the Response 1212 video can be played (while the Shot 1210 video is visually present in the upper portion of the split screen). If, however, the user taps on the Shot 1210 to cause the Response 1212 to disappear and the Shot 1210 video to be played at full screen, then the audio for the Shot 1210 video can be played. In some cases, if there is only one audio track among multiple videos, then the one audio track can be played.

In some implementations, the displaying of the Reaction can be synchronized in accordance with the timing of when the Reaction was generated, relative to the playback of the Shot. For example, if during the creation of the Reaction, the Reaction was initiated at 1.2 seconds into the playback of the Shot, then when viewing the Reaction, the Reaction can be presented also at 1.2 seconds into the playback of the Shot.

Figure 12B:
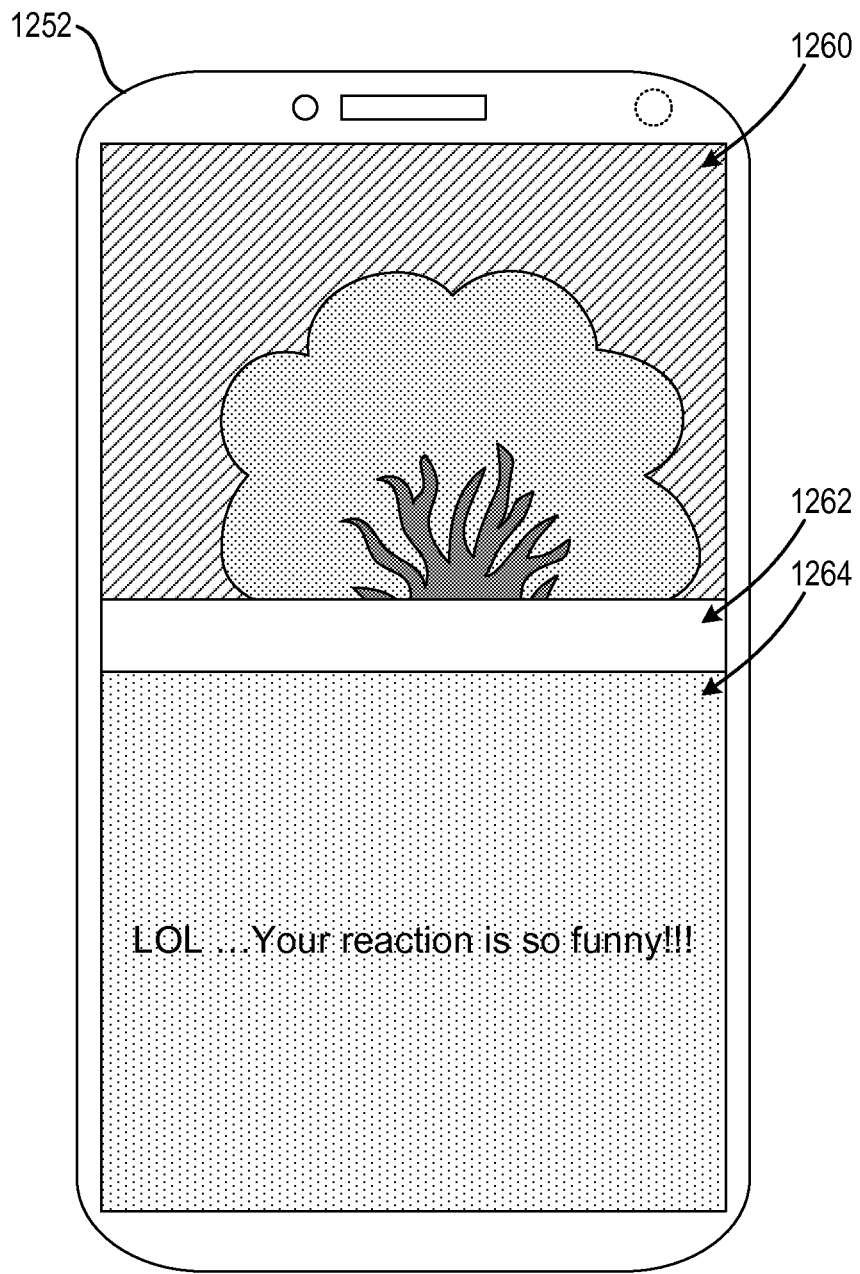
FIG. 12B illustrates an example computing device configured to access responses to responses to exchanged media content, according to an embodiment of the present disclosure.

FIG. 12B illustrates an example computing device 1252 configured to access responses to responses to exchanged media content, according to an embodiment of the present disclosure. In some embodiments, threaded responses can be implemented. In FIG. 12B, the example computing device 1252 can correspond to a computing device of a recipient user, who had previously received a Shot from a sending user and who had subsequently provided a Reaction to the Shot. In the example of FIG. 12B, the computing device 1252 can present a Shot 1260, a Response 1262 to the Shot 1260, and a Response 1264 to the Response 1262 to the Shot 1260.

As discussed previously, a user can tap on a Shot being viewed to cause one or more Reactions (if any) associated with the Shot to appear (or disappear if tapped again). In the example of FIG. 12B, the user can tap on the Shot 1260 to cause the Reaction 1262 to appear (or disappear). The user can further tap on the Reaction 1262 to cause a response to the Reaction 1262 to appear (or disappear). Accordingly, when the user taps on Reaction 1262, Response 1264 can appear. Similarly, if the user taps on Reaction 1264, a response to Reaction 1264 (if any) can appear, such that the response to Reaction 1264 can be displayed where Reaction 1264 was displayed and Reaction 1264 can be displayed where Reaction 1262 was displayed. Numerous variations are possible.

Figure 13:
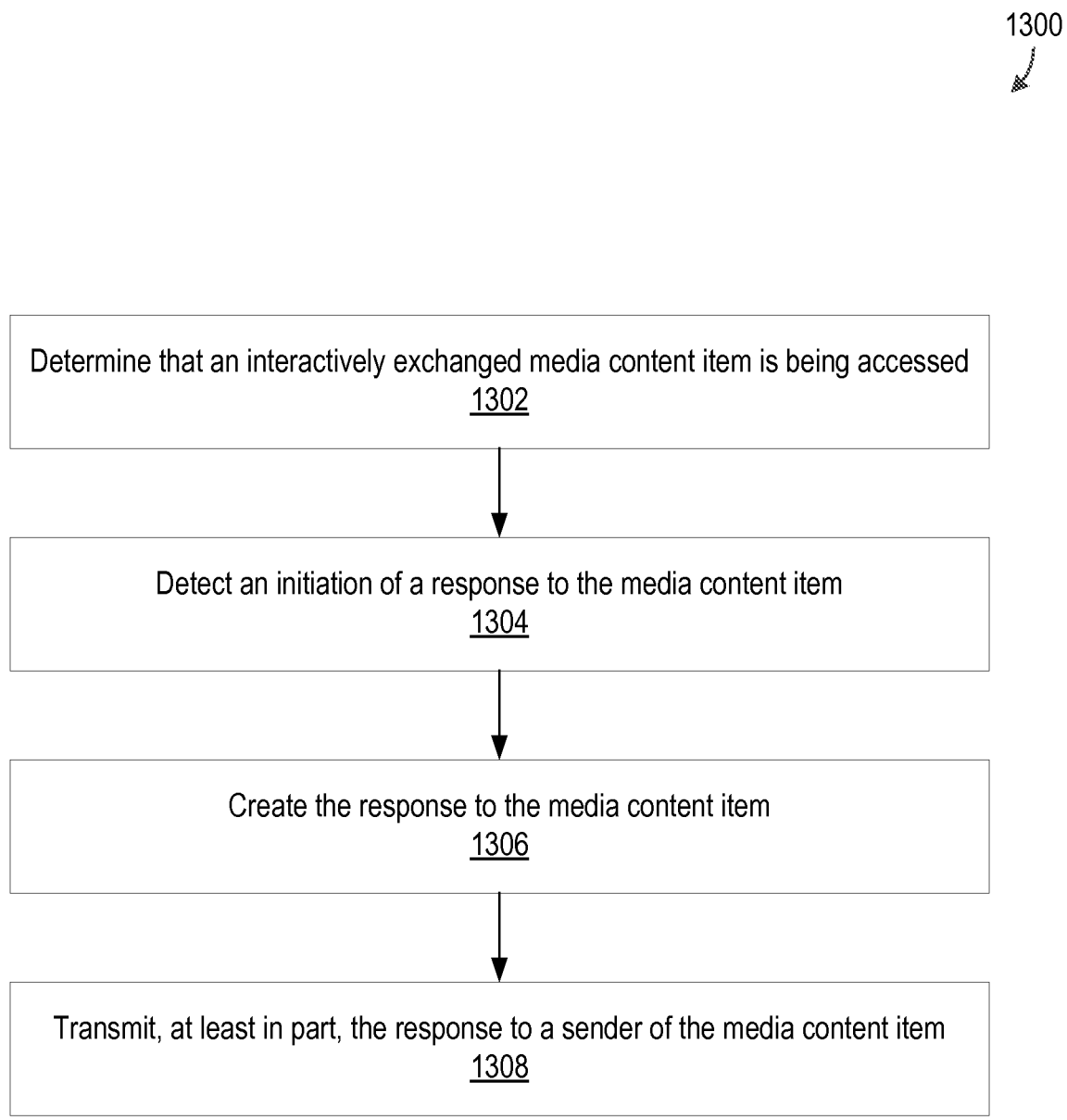
FIG. 13 illustrates an example method for providing responses to exchanged media content, according to an embodiment of the present disclosure.

FIG. 13 illustrates an example method 1300 for providing responses to exchanged media content, according to an embodiment of the present disclosure. At block 1302, the example method 1300 can determine that an interactively exchanged media content item is being accessed. For example, the method 1300 can determine that a recipient user is viewing a Shot received from a sending user. At block 1304, the example method 1300 can detect an initiation of a response to the media content item. The method 1300 can, for example, detect that the recipient user has tapped on the Shot being viewed. At block 1306, the example method 1300 can create the response to the media content item. In one example, the recipient user can capture an image Reaction in response to the Shot. In another example, the recipient user can record a video Reaction in response to the Shot. In a further example, the recipient user can write a text Reaction in response to the Shot. At block 1308, the example method 1300 can transmit, at least in part, the response to a sender of the media content item. For example, the method 1300 can transmit the Reaction created by the recipient user and the received Shot back to the sending user.

It is further contemplated that there can be many other uses, applications, implementations, and/or variations associated with the various embodiments of the present disclosure. As discussed above, responses such as Reactions can, for example, be created for an unobscured version of a content item (e.g., a full view of a Shot). In another example, responses such as Reactions can be created for an obscured version of the content item (e.g., the initially-received Shot). Moreover, responses such as Reactions can be created for content other than Shots, and can be independent of whether the content is obscured or not. In some cases, responses such as Reactions can be created for a message, a communication, and/or various other types of shared data.

Providing Drawings for Media Content

Figure 14:
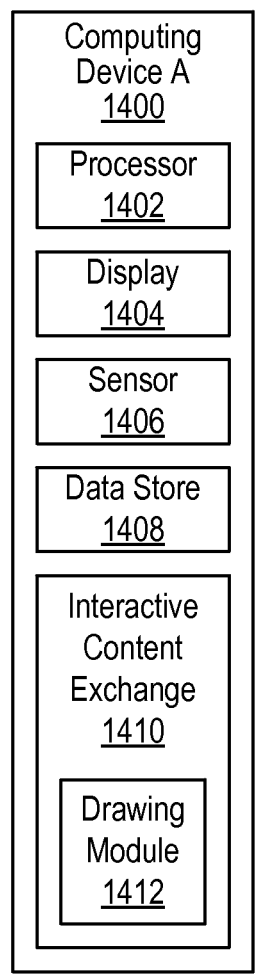
FIG. 14 illustrates an example computing device configured to provide drawings in conjunction with media content to be exchanged, according to an embodiment of the present disclosure.

FIG. 14 illustrates an example computing device 1400 configured to provide drawings in conjunction with media content to be exchanged, according to an embodiment of the present disclosure. The computing device 1400 can, for example, correspond to Computing Device A 120 or Computing Device B 130 of FIG. 1A and FIG. 1B. The example computing device 1400 can include at least one processor 1402, at least one display element 1404, at least one sensor 1406, and at least one data store 1408. The at least one processor 1402 can facilitate various operations or tasks associated with interactively exchanging media content, such as tasks related to providing drawings (or other visual markings) for content to be exchanged. The display element 1404 can be configured to display or present visual content. The sensor 1406 can be configured to acquire, gather, determine, detect, and/or sense data. In some cases, the sensor 1406 can include, but is not limited to, at least one of a touch sensor (e.g., touch display, touch screen), an audio sensor (e.g., microphone), or an image sensor (e.g., camera), an accelerometer, a gyroscope, a locational sensor (e.g., GPS), etc. Moreover, the data store 1408 can be configured to store information associated with various operations or tasks of the computing device 1400.

In addition, the computing device 1400 can include an interactive content exchange module 1410. In the example of FIG. 14, the interactive content exchange module 1410 of the computing device 1400 can include a drawing module 1412. The drawing module 1412 can be configured to facilitate providing drawings (and/or other visual markings) for media content, such as for a Shot that is to be interactively exchanged.

As discussed previously, in some cases, a user of the computing device 1400 can produce media content to be incorporated into a Shot and can edit the media content, such as by drawing on the media content. The media content and the drawing can form the Shot. In some instances, drawing can refer to making a visual marking. For example, drawing can include, but is not limited to, sketching, painting, doodling, diagramming, scribbling, scripting, writing in text, etc.

Providing a drawing or other visual marking for (e.g., in conjunction with, in association with, on top of, overlaying, etc.) media content can alter the media content. In some cases, drawing on a media content item can enhance the media content item or make the media content item more interesting. Providing a drawing for a Shot can allow for a touch of customization, personalized taste, artistic style, humor, creativity, etc., to be added to the Shot.

Figure 15:
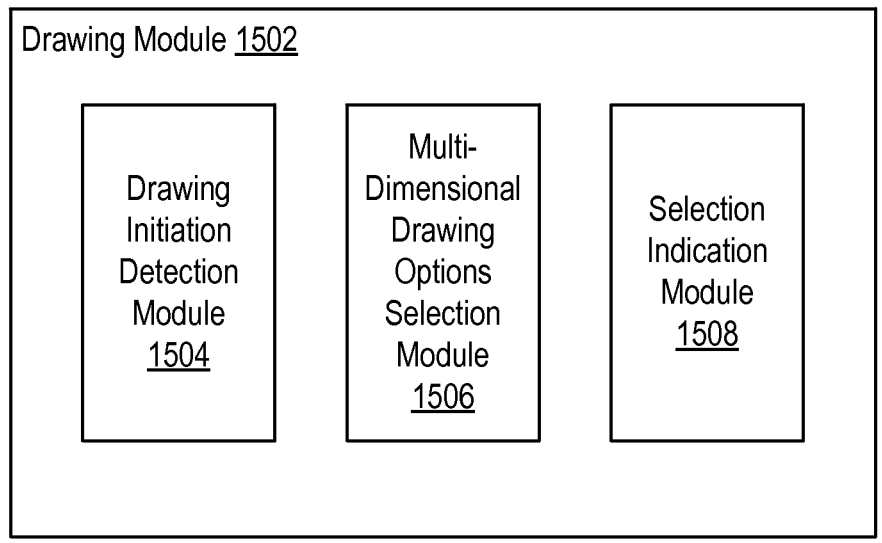
FIG. 15 illustrates an example drawing module configured to provide drawings in conjunction with media content to be exchanged, according to an embodiment of the present disclosure.

FIG. 15 illustrates an example drawing module 1502 configured to provide drawings in conjunction with media content to be exchanged, according to an embodiment of the present disclosure. As shown in the example of FIG. 15, the drawing module 1502 can include a drawing initiation detection module 1504, a multi-dimensional drawing options selection module 1506, and a selection indication module 1508.

The drawing initiation detection module 1504 can detect one or more commands or instructions, such as from a user of a computing device, to activate a drawing mode. For example, the user can tap a button, such as a "Draw" button, to activate the drawing mode and can tap the button again to deactivate the drawing mode. The drawing initiation detection module 1504 can thus detect if and when the button to activate or deactivate the drawing mode has been engaged. Accordingly, in some embodiments, the drawing initiation detection module 1504 can work in conjunction with a touch screen of the computing device to determine whether or not the button has been engaged. When the drawing mode is activated, the user can draw on a media content item. When the user finishes drawing, the media content item including the drawing can be incorporated into a Shot (or Reaction) to be interactively exchanged.

Subsequent to the drawing mode being activated, the multi-dimensional drawing options selection module 1506 can enable the user to select multiple drawing options in a multi-dimensional manner. In some implementations, the multi-dimensional drawing options selection module 1506 can provide a color bar near the edge of the display screen for the user to select a color. In one example, the color bar can be presented vertically along the rightmost edge of the display screen. The user can use his or her finger to slide up and down the vertical color bar to select a color to be used in a drawing. The color bar can correspond to a first drawing option presented in a first dimension (e.g., vertically).

In some embodiments, the multi-dimensional drawing options selection module 1506 can enable a drawing tool size (e.g., brush tip size, pen tip size, etc.) to be selected along a second dimension (e.g., horizontally) as a second drawing option. Continuing with the previous example, without lifting up his or her finger off the touch screen during the color selection, the user can move the finger horizontally to change the drawing tool size. The user can, for example, slide his or her finger from the rightmost edge to the left in order to increase the size of the drawing tool. If the user only moves the finger horizontally, then the selected color can be retained but the drawing tool size can change. If the user only moves the finger vertically, then the selected drawing tool size can be retained but the color can change. If the user moves the finger along both dimensions simultaneously (e.g., diagonally), then the user can change both the color and drawing tool size selections at the same time.

When the user lifts his or her finger off the touch screen, the selections of the drawing options can be confirmed, finalized, or acknowledged. The user can then place his or her finger on the touch screen again and move the finger to make drawings using the selected drawing options, such as the selected color and the selected drawing tool size. If the user desires to change the drawing options, he or she can touch his or her finger at the color bar again and drag the finger to a position that corresponds to his or her desired drawing option selections.

In some implementations, a third drawing option can be presented in a third dimension, such as time. In one example, when the user holds his or her finger position at a selected color and drawing tool size, beyond a time threshold, the multi-dimensional drawing options selection module 1506 can cycle through different types or styles of drawing tools from a list of drawing tools. The types or styles of drawing tools can include, but are not limited to, at least one of a paint brush, a water color brush, a marker, a crayon, a pencil, a pen, an airbrush, spray paint, etc. Again, when the user lifts his or her finger off the touch screen, the selections of the drawing options are confirmed. The user can then touch his or her finger on the touch screen to draw using the selected drawing options.

In some embodiments, the color bar may be replaced with or supplemented by a different utility bar or other visual element that allows selection of other drawing options. Further, movement of the finger of a user in n dimensions with respect to the utility bar can allow the user to select n different drawing options apart from or in addition to color, drawing tool size, or drawing tool styles.

In some embodiments, multiple bars can be presented along multiple edges of the display screen. In one example, the types or styles of drawing tools can be presented in a vertical bar along the leftmost edge of the display screen. The user can move his or her finger up and down on the left side of the screen to select a desired drawing tool style or type. Many other variations are also possible.

Moreover, the selection indication module 1508 can be configured to indicate (e.g., dynamically, in real-time) the currently selected drawing options. In some instances, there can be at least one indicator for each drawing option. In one example, the "Draw" button can change color to reflect a currently selected color. In another example, there can be a circular indicator with an outer ring that can change in color to reflect the currently selected color. In a further example, there can be a drawing tool indicator (e.g., a circular shape within the outer ring of the circular indicator) that can reflect the currently selected size of the drawing tool. As the selected drawing tool size is increased, the circular shape can, for example, increase in size accordingly.

Figure 16:
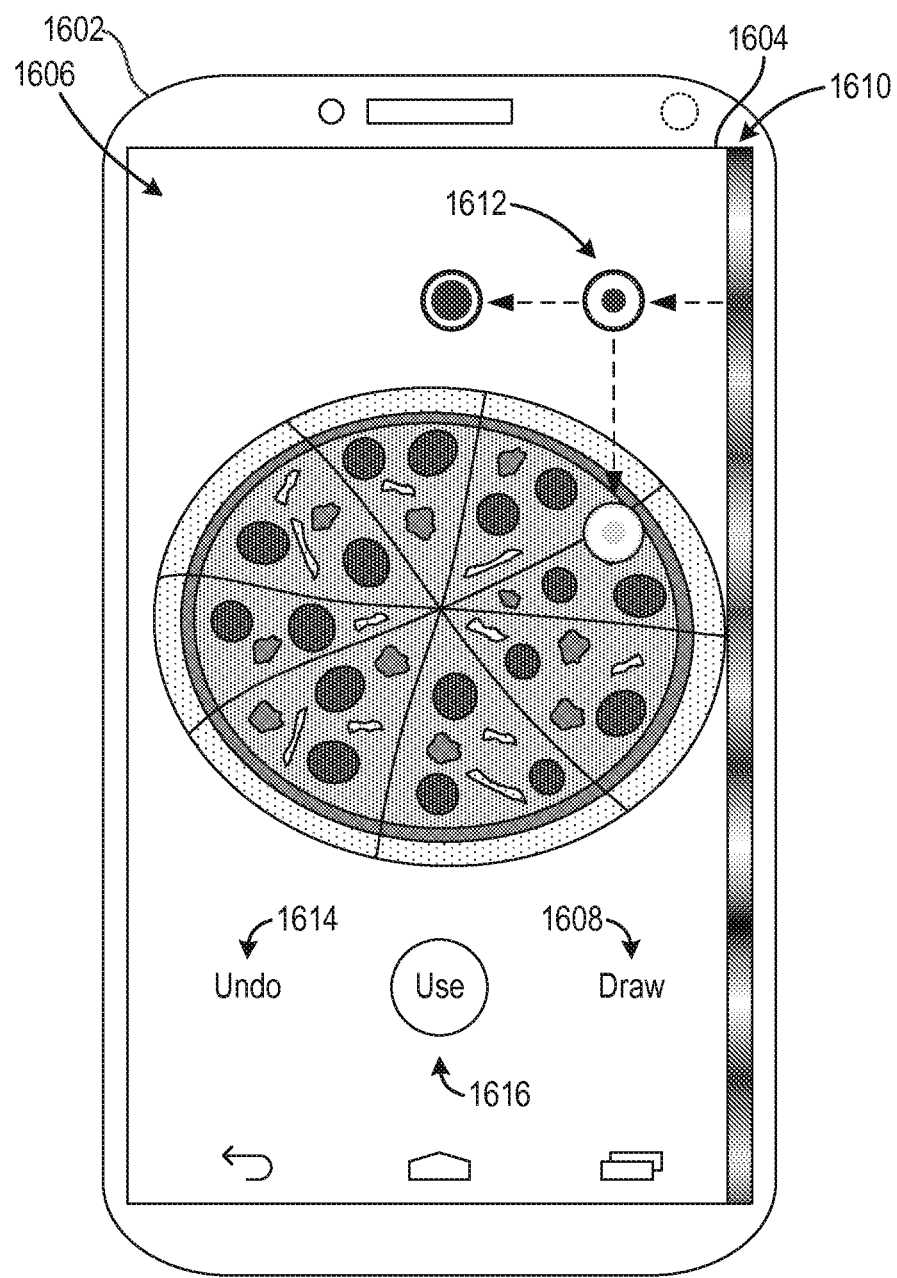
FIG. 16 illustrates an example computing device configured to provide an interactive user interface for selecting drawing options, according to an embodiment of the present disclosure.

FIG. 16 illustrates an example computing device 1602 configured to provide an interactive user interface for selecting drawing options, according to an embodiment of the present disclosure. In the example of FIG. 16, the computing device 1602 can include a display element 1604, such as a touch screen, which can be configured to display media content 1606 to be included in a Shot for transmission or interactive exchange.

As shown in FIG. 16, there can be a button (e.g., "Draw" button) 1608 which activates a drawing mode when selected and deactivates the drawing mode when deselected. When the drawing mode is not activated, the media content 1606 can be displayed on the screen 1604 in full. When the drawing mode is activated, the user can make drawings (or other visual markings) on the media content 1606.

In some embodiments, when the drawing mode is activated, the computing device 1602 can present a first drawing option in a first dimension, such as a color selection bar or index 1610 in a vertical dimension. In the example of FIG. 16, the color selection bar (i.e., color bar) 1610 can be presented along the rightmost edge of the screen 1604. The color bar 1610 can provide the user with a range of colors to select from, to be used for drawing. In some embodiments, the color bar 1610 can present a full color spectrum. In some embodiments, the color bar 1610 can present a number of distinct colors (e.g., popular colors, well-known colors, etc.) and interpolate between them. Any color and/or shade presented in the color bar 1610 can be selectable by the user. To select a color, the user can place his or her finger on the color bar 1610 and move through the bar (e.g., move up and down through the vertical color bar).

Furthermore, in some implementations, the computing device 1602 can present a second drawing option in a second dimension, such as by enabling selection of a drawing tool size through a horizontal dimension. For example, the user can place his or her finger on the rightmost color bar 1610 and move leftward to increase the drawing tool size (e.g., brush size, pen size, air brush area, line thickness, etc.). Similarly, moving rightward can decrease the drawing tool size. As such, the user can select a color along the vertical direction and a drawing tool size along the horizontal direction, without lifting up his or her finger.

In addition, there can be at least one indicator for each drawing option. In some embodiments, multiple drawing options can be indicated by a single indicator. In FIG. 16, there can be a circular indicator 1612 for both the currently selected color and the currently selected drawing tool size. If the user's finger starts at the color bar 1610 and moves leftward only, the indicator 1612 can show in real-time the increase in drawing tool size while the color is retained. If the user's finger remains at a particular horizontal position and only moves downward, then the indicator 1612 can show in real-time the change in color while the drawing tool size is retained. It is contemplated that other drawing options, dimensions, and/or variations, such as color wheels, brush wheels, and shading bars, are also possible.

When the user lifts up his or her finger, the drawing option selections can be confirmed. Then the user can move his or her finger on the screen (outside the color bar 1610) to draw. The drawing will be performed using the confirmed drawing option selections.

Moreover, in some embodiments, there can be an option to undo drawings, such as via an "Undo" button 1614. When the "Undo" button 1614 is tapped, the last or most recent drawing step is undone. When the "Undo" button 1614 is held down, all drawings are cleared. In some instances, there can be tactile feedback, such as a vibration, when all drawings are cleared.

When the user has finished drawing on the media content 1606, the user can select the "Use" button 1616. The drawing and the media content 1606 can be sent as a Shot to a recipient.

Figure 17:
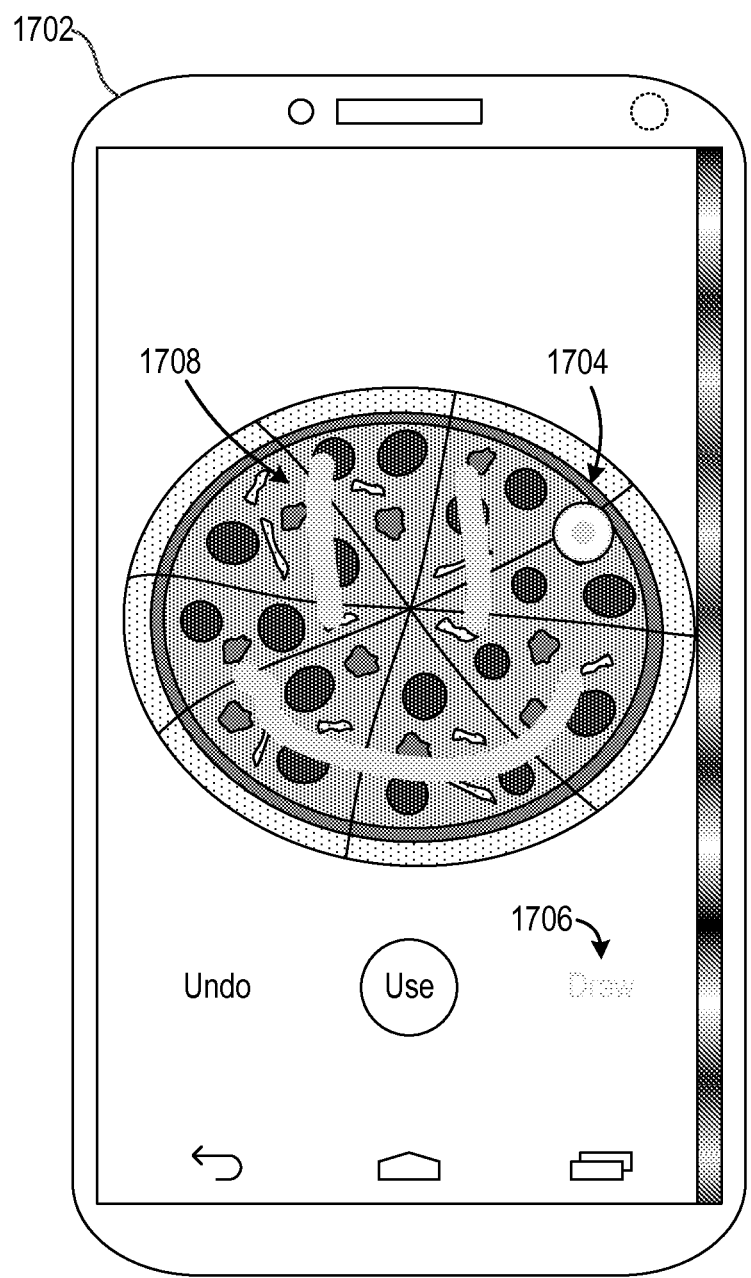
FIG. 17 illustrates an example computing device configured to provide drawings based on selected drawing options, according to an embodiment of the present disclosure.

FIG. 17 illustrates an example computing device 1702 configured to provide drawings based on selected drawing options, according to an embodiment of the present disclosure. The example computing device 1702 can provide an indicator 1704 that reflects in real-time the currently selected color and drawing tool size. Moreover, in some embodiments, the "Draw" button 1706 can also change in color in real-time to reflect the currently selected color.

In some implementations, the circular indicator 1704 can move in accordance with the user's finger as the user selects the drawing options. For example, if the user moves his or her finger upward and downward, the circular indicator 1704 can move upward and downward too. If the finger moves left and right, the circular indicator 1704 can move left and right as well. In some cases, if the finger moves too far to the left (near the left edge of the screen), the circular indicator 1704 can "jump" back rightward such that the finger is not covering or obscuring the indicator 1704.

In the example of FIG. 17, the user can make a drawing 1708 on top of media content. In some cases, buttons, indicators, and drawing option selections can disappear or fade out when the user draws. In some instances, audio such as background music can be played when the drawing mode is activated. The audio can, in some cases, be customizable. Moreover, as the user draws, each stroke of the drawing can be accompanied by audio, such as sound effects.

In some embodiments, drawing stroke analysis can be performed. Directional changes in drawing strokes, stroke speed, stroke length, drawing tool type or style, drawing tool size, and/or various other factors can be taken into consideration when playing the audio. For example, quick short strokes with lots of directional changes can result in a scribbling sound effect being played. In another example, a long straight stroke with a large brush size can trigger a smooth paint brush sound effect. Other sound effect examples can include a squeak, a long stroke, a lift-up sound, a scribble, a quick swipe, a tap, etc. Numerous other variations are possible. In some cases, the sound effects can be stereo, such that when a drawing is made on one side of the screen, the audio is played on one side.

In some implementations, the user can tap and hold his or her finger at a screen area to generate a circular shape, filled in the selected color, that grows in size until the user lifts up his or her finger. In some cases, the circular shape can be used like a speech bubble and text can be written in the circular shape. There can also be a sound effect during the growing of the circular shape.

In some embodiments, the user can generate drawings using two fingers simultaneously. In some cases, the user can use one finger to select and change drawing options, such as color and drawing tool size, and can use another finger to make drawings. When two fingers are applied to the screen area at the same time, one finger may select (and change) the color and drawing tool size while the other finger creates or sketches a drawing.

Figure 18:
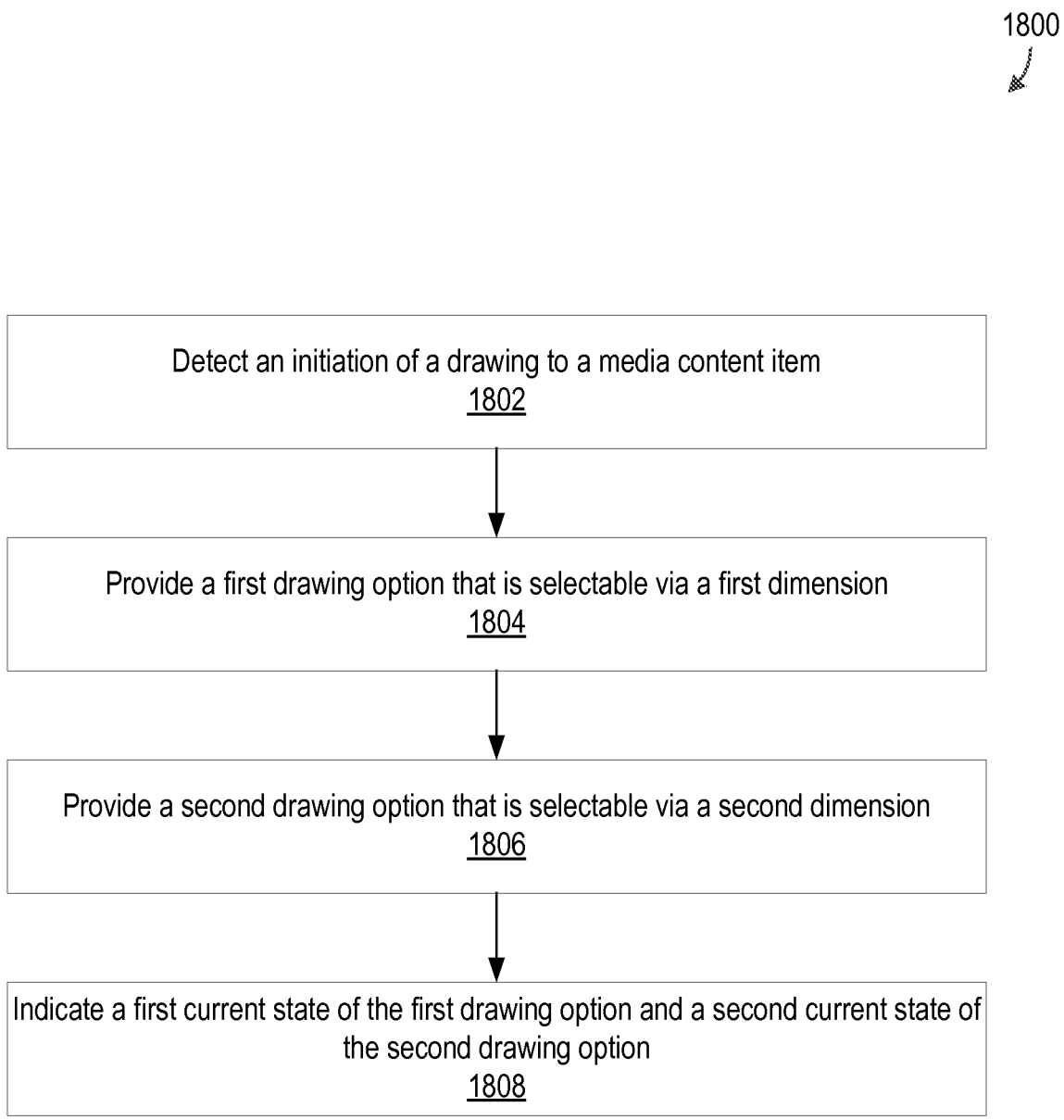
FIG. 18 illustrates an example method for providing an interactive user interface for selecting drawing options, according to an embodiment of the present disclosure.

FIG. 18 illustrates an example method 1800 for providing an interactive user interface for selecting drawing options, according to an embodiment of the present disclosure. At block 1802, the example method 1800 can detect an initiation of a drawing to a media content item. For example, the method 1800 can determine that a user has activated a drawing mode to draw on a media content item to be included in a Shot. At block 1804, the example method 1800 can provide a first drawing option that is selectable via a first dimension, such as a vertical color bar. At block 1806, the example method 1800 can provide a second drawing option that is selectable via a second dimension, such as a drawing tool size selectable in a horizontal direction. At block 1808, the example method 1800 can indicate a first current state of the first drawing option and a second current state of the second drawing option. For example, the method 1800 can provide a circular indicator that indicates in real-time the current color selection and the current drawing tool size selection.

It is further contemplated that there can be many other uses, applications, implementations, and/or variations associated with the various embodiments of the present disclosure.

Social Networking System—Example Implementation

Figure 19:
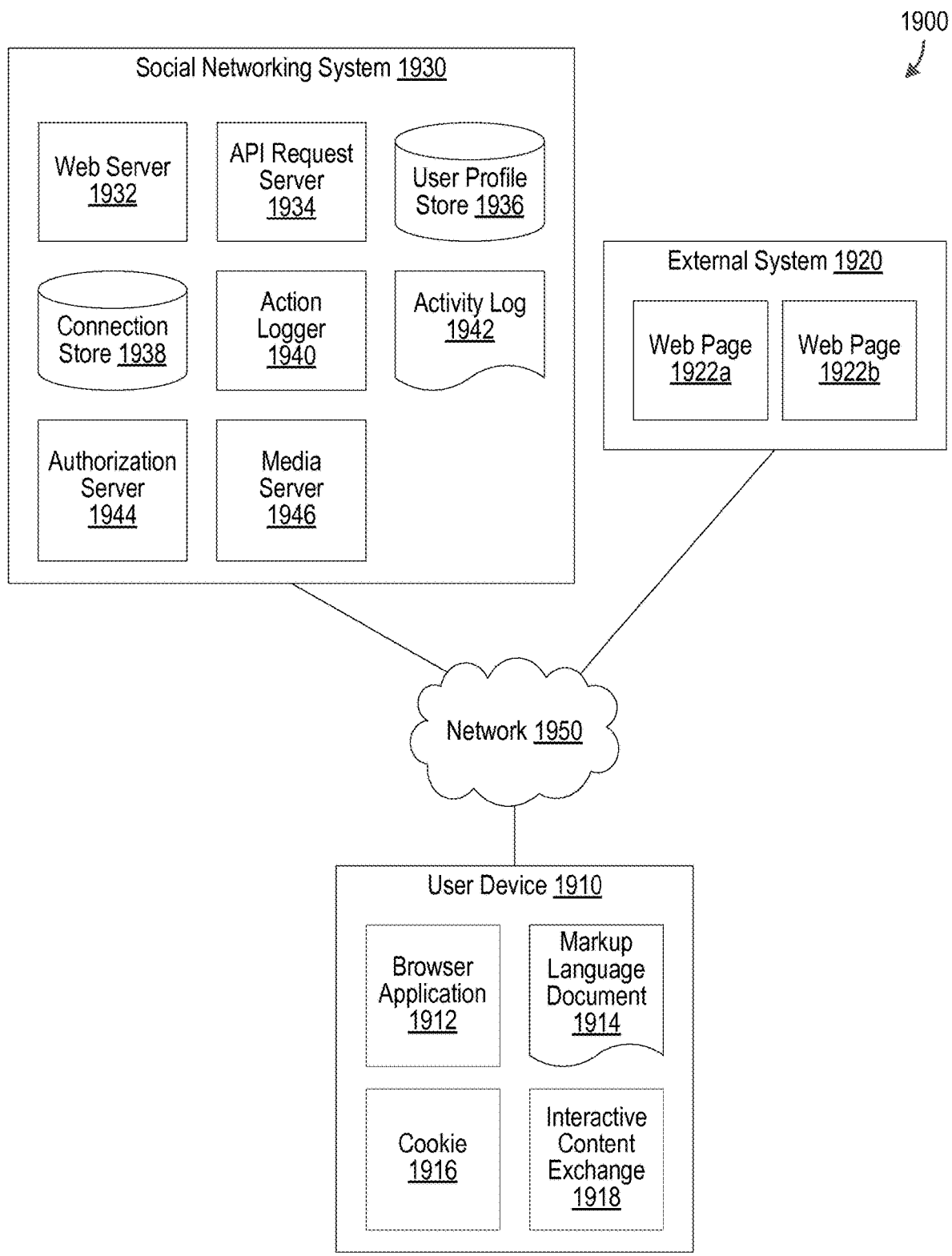
FIG. 19 illustrates a network diagram of an example system that can be utilized in various scenarios, according to an embodiment of the present disclosure.

FIG. 19 illustrates a network diagram of an example system 1900 that can be utilized in various scenarios, in accordance with an embodiment of the present disclosure. The system 1900 includes one or more user devices 1910, one or more external systems 1920, a social networking system 1930, and a network 1950. In an embodiment, the social networking service, provider, and/or system discussed in connection with the embodiments described above may be implemented as the social networking system 1930. For purposes of illustration, the embodiment of the system 1900, shown by FIG. 19, includes a single external system 1920 and a single user device 1910. However, in other embodiments, the system 1900 may include more user devices 1910 and/or more external systems 1920. In certain embodiments, the social networking system 1930 is operated by a social network provider, whereas the external systems 1920 are separate from the social networking system 1930 in that they may be operated by different entities. In various embodiments, however, the social networking system 1930 and the external systems 1920 operate in conjunction to provide social networking services to users (or members) of the social networking system 1930. In this sense, the social networking system 1930 provides a platform or backbone, which other systems, such as external systems 1920, may use to provide social networking services and functionalities to users across the Internet.

The user device 1910 comprises one or more computing devices that can receive input from a user and transmit and receive data via the network 1950. In one embodiment, the user device 1910 is a conventional computer system executing, for example, a Microsoft Windows compatible operating system (OS), Apple OS X, and/or a Linux distribution. In another embodiment, the user device 1910 can be a device having computer functionality, such as a smart-phone, a tablet, a personal digital assistant (PDA), a mobile telephone, etc. The user device 1910 is configured to communicate via the network 1950. The user device 1910 can execute an application, for example, a browser application that allows a user of the user device 1910 to interact with the social networking system 1930. In another embodiment, the user device 1910 interacts with the social networking system 1930 through an application programming interface (API) provided by the native operating system of the user device 1910, such as iOS and ANDROID. The user device 1910 is configured to communicate with the external system 1920 and the social networking system 1930 via the network 1950, which may comprise any combination of local area and/or wide area networks, using wired and/or wireless communication systems.

In one embodiment, the network 1950 uses standard communications technologies and protocols. Thus, the network 1950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 1950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 1950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 1910 may display content from the external system 1920 and/or from the social networking system 1930 by processing a markup language document 1914 received from the external system 1920 and from the social networking system 1930 using a browser application 1912. The markup language document 1914 identifies content and one or more instructions describing formatting or presentation of the content. By executing the instructions included in the markup language document 1914, the browser application 1912 displays the identified content using the format or presentation described by the markup language document 1914. For example, the markup language document 1914 includes instructions for generating and displaying a web page having multiple frames that include text and/or image data retrieved from the external system 1920 and the social networking system 1930. In various embodiments, the markup language document 1914 comprises a data file including extensible markup language (XML) data, extensible hypertext markup language (XHTML) data, or other markup language data. Additionally, the markup language document 1914 may include JavaScript Object Notation (JSON) data, JSON with padding (JSONP), and JavaScript data to facilitate data-interchange between the external system 1920 and the user device 1910. The browser application 1912 on the user device 1910 may use a JavaScript compiler to decode the markup language document 1914.

The markup language document 1914 may also include, or link to, applications or application frameworks such as FLASH™ or Unity™ applications, the SilverLight™ application framework, etc.

In one embodiment, the user device 1910 also includes one or more cookies 1916 including data indicating whether a user of the user device 1910 is logged into the social networking system 1930, which may enable modification of the data communicated from the social networking system 1930 to the user device 1910.

The external system 1920 includes one or more web servers that include one or more web pages 1922a, 1922b, which are communicated to the user device 1910 using the network 1950. The external system 1920 is separate from the social networking system 1930. For example, the external system 1920 is associated with a first domain, while the social networking system 1930 is associated with a separate social networking domain. Web pages 1922a, 1922b, included in the external system 1920, comprise markup language documents 1914 identifying content and including instructions specifying formatting or presentation of the identified content.

The social networking system 1930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 1930 may be administered, managed, or controlled by an operator. The operator of the social networking system 1930 may be a human being, an automated application, or a series of applications for managing content, regulating policies, and collecting usage metrics within the social networking system 1930. Any type of operator may be used.

Users may join the social networking system 1930 and then add connections to any number of other users of the social networking system 1930 to whom they desire to be connected. As used herein, the term "friend" refers to any other user of the social networking system 1930 to whom a user has formed a connection, association, or relationship via the social networking system 1930. For example, in an embodiment, if users in the social networking system 1930 are represented as nodes in the social graph, the term "friend" can refer to an edge formed between and directly connecting two user nodes.

Connections may be added explicitly by a user or may be automatically created by the social networking system 1930 based on common characteristics of the users (e.g., users who are alumni of the same educational institution). For example, a first user specifically selects a particular other user to be a friend. Connections in the social networking system 1930 are usually in both directions, but need not be, so the terms "user" and "friend" depend on the frame of reference. Connections between users of the social networking system 1930 are usually bilateral ("two-way"), or "mutual," but connections may also be unilateral, or "one-way." For example, if Bob and Joe are both users of the social networking system 1930 and connected to each other, Bob and Joe are each other's connections. If, on the other hand, Bob wishes to connect to Joe to view data communicated to the social networking system 1930 by Joe, but Joe does not wish to form a mutual connection, a unilateral connection may be established. The connection between users may be a direct connection; however, some embodiments of the social networking system 1930 allow the connection to be indirect via one or more levels of connections or degrees of separation.

In addition to establishing and maintaining connections between users and allowing interactions between users, the social networking system 1930 provides users with the ability to take actions on various types of items supported by the social networking system 1930. These items may include groups or networks (i.e., social networks of people, entities, and concepts) to which users of the social networking system 1930 may belong, events or calendar entries in which a user might be interested, computer-based applications that a user may use via the social networking system 1930, transactions that allow users to buy or sell items via services provided by or through the social networking system 1930, and interactions with advertisements that a user may perform on or off the social networking system 1930. These are just a few examples of the items upon which a user may act on the social networking system 1930, and many others are possible. A user may interact with anything that is capable of being represented in the social networking system 1930 or in the external system 1920, separate from the social networking system 1930, or coupled to the social networking system 1930 via the network 1950.

The social networking system 1930 is also capable of linking a variety of entities. For example, the social networking system 1930 enables users to interact with each other as well as external systems 1920 or other entities through an API, a web service, or other communication channels. The social networking system 1930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 1930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 1930 modifies edges connecting the various nodes to reflect the relationships and interactions.

The social networking system 1930 also includes user-generated content, which enhances a user's interactions with the social networking system 1930. User-generated content may include anything a user can add, upload, send, or "post" to the social networking system 1930. For example, a user communicates posts to the social networking system 1930 from a user device 1910. Posts may include data such as status updates or other textual data, location information, images such as photos, videos, links, music or other similar data and/or media. Content may also be added to the social networking system 1930 by a third party. Content "items" are represented as objects in the social networking system 1930. In this way, users of the social networking system 1930 are encouraged to communicate with each other by posting text and content items of various types of media through various communication channels. Such communication increases the interaction of users with each other and increases the frequency with which users interact with the social networking system 1930.

The social networking system 1930 includes a web server 1932, an API request server 1934, a user profile store 1936, a connection store 1938, an action logger 1940, an activity log 1942, and an authorization server 1944. In an embodiment of the invention, the social networking system 1930 may include additional, fewer, or different components for various applications. Other components, such as network interfaces, security mechanisms, load balancers, failover servers, management and network operations consoles, and the like are not shown so as to not obscure the details of the system.

The user profile store 1936 maintains information about user accounts, including biographic, demographic, and other types of descriptive information, such as work experience, educational history, hobbies or preferences, location, and the like that has been declared by users or inferred by the social networking system 1930. This information is stored in the user profile store 1936 such that each user is uniquely identified. The social networking system 1930 also stores data describing one or more connections between different users in the connection store 1938. The connection information may indicate users who have similar or common work experience, group memberships, hobbies, or educational history. Additionally, the social networking system 1930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 1930, such as non-person entities, buckets, cluster centers, images, interests, pages, external systems, concepts, and the like are also stored in the connection store 1938.

The social networking system 1930 maintains data about objects with which a user may interact. To maintain this data, the user profile store 1936 and the connection store 1938 store instances of the corresponding type of objects maintained by the social networking system 1930. Each object type has information fields that are suitable for storing information appropriate to the type of object. For example, the user profile store 1936 contains data structures with fields suitable for describing a user's account and information related to a user's account. When a new object of a particular type is created, the social networking system 1930 initializes a new data structure of the corresponding type, assigns a unique object identifier to it, and begins to add data to the object as needed. This might occur, for example, when a user becomes a user of the social networking system 1930, the social networking system 1930 generates a new instance of a user profile in the user profile store 1936, assigns a unique identifier to the user account, and begins to populate the fields of the user account with information provided by the user.

The connection store 1938 includes data structures suitable for describing a user's connections to other users, connections to external systems 1920 or connections to other entities. The connection store 1938 may also associate a connection type with a user's connections, which may be used in conjunction with the user's privacy setting to regulate access to information about the user. In an embodiment of the invention, the user profile store 1936 and the connection store 1938 may be implemented as a federated database.

Data stored in the connection store 1938, the user profile store 1936, and the activity log 1942 enables the social networking system 1930 to generate the social graph that uses nodes to identify various objects and edges connecting nodes to identify relationships between different objects. For example, if a first user establishes a connection with a second user in the social networking system 1930, user accounts of the first user and the second user from the user profile store 1936 may act as nodes in the social graph. The connection between the first user and the second user stored by the connection store 1938 is an edge between the nodes associated with the first user and the second user. Continuing this example, the second user may then send the first user a message within the social networking system 1930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 1930 (or, alternatively, in an image maintained by another system outside of the social networking system 1930). The image may itself be represented as a node in the social networking system 1930. This tagging action may create edges between the first user and the second user as well as create an edge between each of the users and the image, which is also a node in the social graph. In yet another example, if a user confirms attending an event, the user and the event are nodes obtained from the user profile store 1936, where the attendance of the event is an edge between the nodes that may be retrieved from the activity log 1942. By generating and maintaining the social graph, the social networking system 1930 includes data describing many different types of objects and the interactions and connections among those objects, providing a rich source of socially relevant information.

The web server 1932 links the social networking system 1930 to one or more user devices 1910 and/or one or more external systems 1920 via the network 1950. The web server 1932 serves web pages, as well as other web-related content, such as Java, JavaScript, Flash, XML, and so forth. The web server 1932 may include a mail server or other messaging functionality for receiving and routing messages between the social networking system 1930 and one or more user devices 1910. The messages can be instant messages, queued messages (e.g., email), text and SMS messages, or any other suitable messaging format.

The API request server 1934 allows one or more external systems 1920 and user devices 1910 to call access information from the social networking system 1930 by calling one or more API functions. The API request server 1934 may also allow external systems 1920 to send information to the social networking system 1930 by calling APIs. The external system 1920, in one embodiment, sends an API request to the social networking system 1930 via the network 1950, and the API request server 1934 receives the API request. The API request server 1934 processes the request by calling an API associated with the API request to generate an appropriate response, which the API request server 1934 communicates to the external system 1920 via the network 1950. For example, responsive to an API request, the API request server 1934 collects data associated with a user, such as the user's connections that have logged into the external system 1920, and communicates the collected data to the external system 1920. In another embodiment, the user device 1910 communicates with the social networking system 1930 via APIs in the same manner as external systems 1920.

The action logger 1940 is capable of receiving communications from the web server 1932 about user actions on and/or off the social networking system 1930. The action logger 1940 populates the activity log 1942 with information about user actions, enabling the social networking system 1930 to discover various actions taken by its users within the social networking system 1930 and outside of the social networking system 1930. Any action that a particular user takes with respect to another node on the social networking system 1930 may be associated with each user's account, through information maintained in the activity log 1942 or in a similar database or other data repository. Examples of actions taken by a user within the social networking system 1930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 1930, the action is recorded in the activity log 1942. In one embodiment, the social networking system 1930 maintains the activity log 1942 as a database of entries. When an action is taken within the social networking system 1930, an entry for the action is added to the activity log 1942. The activity log 1942 may be referred to as an action log.

Additionally, user actions may be associated with concepts and actions that occur within an entity outside of the social networking system 1930, such as an external system 1920 that is separate from the social networking system 1930. For example, the action logger 1940 may receive data describing a user's interaction with an external system 1920 from the web server 1932. In this example, the external system 1920 reports a user's interaction according to structured actions and objects in the social graph.

Other examples of actions where a user interacts with an external system 1920 include a user expressing an interest in an external system 1920 or another entity, a user posting a comment to the social networking system 1930 that discusses an external system 1920 or a web page 1922a within the external system 1920, a user posting to the social networking system 1930 a Uniform Resource Locator (URL) or other identifier associated with an external system 1920, a user attending an event associated with an external system 1920, or any other action by a user that is related to an external system 1920. Thus, the activity log 1942 may include actions describing interactions between a user of the social networking system 1930 and an external system 1920 that is separate from the social networking system 1930.

The authorization server 1944 enforces one or more privacy settings of the users of the social networking system 1930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 1920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 1920. One embodiment allows the specification of the set of entities to comprise an enumeration of entities. For example, the user may provide a list of external systems 1920 that are allowed to access certain information. Another embodiment allows the specification to comprise a set of entities along with exceptions that are not allowed to access the information. For example, a user may allow all external systems 1920 to access the user's work information, but specify a list of external systems 1920 that are not allowed to access the work information. Certain embodiments call the list of exceptions that are not allowed to access certain information a "block list". External systems 1920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 1944 contains logic to determine if certain information associated with a user can be accessed by a user's friends, external systems 1920, and/or other applications and entities. The external system 1920 may need authorization from the authorization server 1944 to access the user's more private and sensitive information, such as the user's work phone number. Based on the user's privacy settings, the authorization server 1944 determines if another user, the external system 1920, an application, or another entity is allowed to access information associated with the user, including information about actions taken by the user.

The social networking system 1930 can include a media server 1946. In some embodiments, the media server 1946 can be implemented as the media server 110 of FIG. 1. The media server 1946 can be configured to facilitate interactively exchanging media content. For example, the media server 1946 can be configured to relay information among one or more computing devices (e.g., user device 1910, computer system 2000 in FIG. 20) engaging in interactive exchange of media content. Moreover, in some embodiments, the user device 1910 can comprise an interactive content exchange component 1918. The interactive content exchange component 1918 can be configured to facilitate various operations associated with interactively exchanging media content. For example, the interactive content exchange component 1918 can correspond to the interactive content exchange applications 129 and 139 of FIG. 1A and FIG. 1B. In another example, the interactive content exchange component 1918 can correspond to the interactive content exchange module 910 of FIG. 9, which can be configured to provide responses or Reactions to exchanged media content. In a further example, the interactive content exchange component 1918 can correspond to the interactive content exchange module 1410 of FIG. 14, which can be configured to provide drawings in conjunction with media content to be interactively exchanged.

Hardware Implementation

Figure 20:
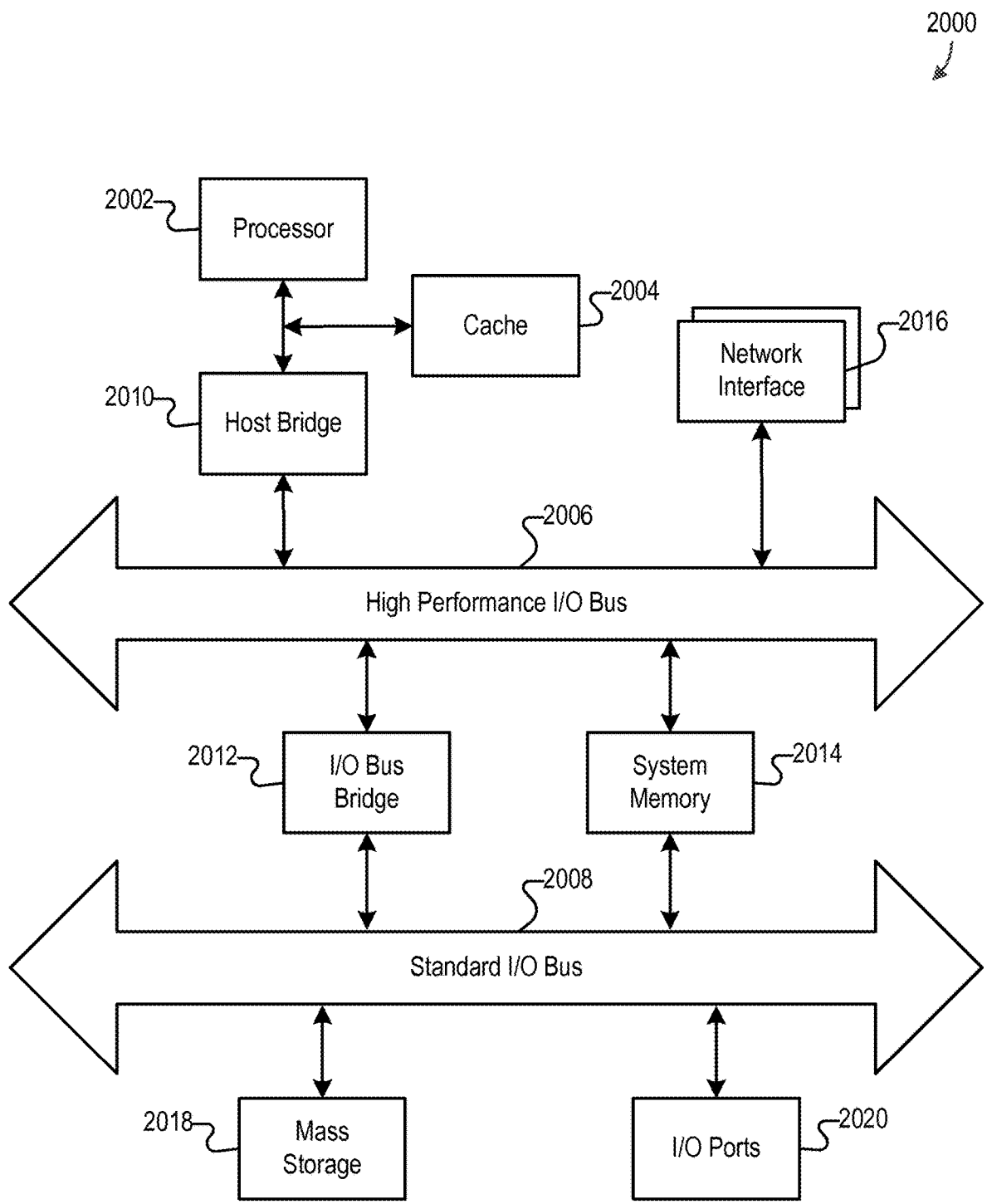
FIG. 20 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 20 illustrates an example of a computer system 2000 that may be used to implement one or more of the embodiments described herein in accordance with an embodiment of the invention. The computer system 2000 includes sets of instructions for causing the computer system 2000 to perform the processes and features discussed herein. The computer system 2000 may be connected (e.g., networked) to other machines. In a networked deployment, the computer system 2000 may operate in the capacity of a server machine or a client machine in a client-server network environment, or as a peer machine in a peer-to-peer (or distributed) network environment. In an embodiment of the invention, the computer system 2000 may be the social networking system 1930, the user device 1910, and the external system 1920, or a component thereof. In an embodiment of the invention, the computer system 2000 may be one server among many that constitutes all or part of the social networking system 1930.

The computer system 2000 includes a processor 2002, a cache 2004, and one or more executable modules and drivers, stored on a computer-readable medium, directed to the processes and features described herein. Additionally, the computer system 2000 includes a high performance input/output (I/O) bus 2006 and a standard I/O bus 2008. A host bridge 2010 couples processor 2002 to high performance I/O bus 2006, whereas I/O bus bridge 2012 couples the two buses 2006 and 2008 to each other. A system memory 2014 and one or more network interfaces 2016 couple to high performance I/O bus 2006. The computer system 2000 may further include video memory and a display device coupled to the video memory (not shown). Mass storage 2018 and I/O ports 2020 couple to the standard I/O bus 2008. The computer system 2000 may optionally include a keyboard and pointing device, a display device, or other input/output devices (not shown) coupled to the standard I/O bus 2008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 2000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 2000 are described in greater detail below. In particular, the network interface 2016 provides communication between the computer system 2000 and any of a wide range of networks, such as an Ethernet (e.g., IEEE 802.3) network, a backplane, etc. The mass storage 2018 provides permanent storage for the data and programming instructions to perform the above-described processes and features implemented by the respective computing systems identified above, whereas the system memory 2014 (e.g., DRAM) provides temporary storage for the data and programming instructions when executed by the processor 2002. The I/O ports 2020 may be one or more serial and/or parallel communication ports that provide communication between additional peripheral devices, which may be coupled to the computer system 2000.

The computer system 2000 may include a variety of system architectures, and various components of the computer system 2000 may be rearranged. For example, the cache 2004 may be on-chip with processor 2002. Alternatively, the cache 2004 and the processor 2002 may be packed together as a "processor module", with processor 2002 being referred to as the "processor core". Furthermore, certain embodiments of the invention may neither require nor include all of the above components. For example, peripheral devices coupled to the standard I/O bus 2008 may couple to the high performance I/O bus 2006. In addition, in some embodiments, only a single bus may exist, with the components of the computer system 2000 being coupled to the single bus. Furthermore, the computer system 2000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 2000 that, when read and executed by one or more processors, cause the computer system 2000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 2000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 2002. Initially, the series of instructions may be stored on a storage device, such as the mass storage 2018. However, the series of instructions can be stored on any suitable computer readable storage medium. Furthermore, the series of instructions need not be stored locally, and could be received from a remote storage device, such as a server on a network, via the network interface 2016. The instructions are copied from the storage device, such as the mass storage 2018, into the system memory 2014 and then accessed and executed by the processor 2002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 2000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, a media content item captured by a camera;
detecting, by the computing system, an initiation of a drawing to the media content item;
providing, by the computing system, a first drawing option presented in a first dimension, wherein a first current state of the first drawing option is selectable via progression along a touchscreen display in the first dimension;
providing, by the computing system, a second drawing option presented in a second dimension, wherein a second current state of the second drawing option is selectable via progression along the touchscreen display in the second dimension;
providing, by the computing system, a third drawing option that is selectable based on a length of time a user contacts the touchscreen display, wherein the third drawing option allows a user to utilize a time-based cycling to cycle through and select a drawing tool type from a plurality of drawing tool types by contacting the touchscreen display beyond a time threshold; and
drawing on the media content item based on the selected options;
wherein the first, second, and third drawing options are selectable with a single continuous interaction with the touchscreen display.

2. The computer-implemented method of claim 1, wherein the media content item comprises a video.

3. The computer-implemented method of claim 1, wherein the detecting of the initiation of the drawing to the media content item further comprises:
determining that a user has activated a drawing mode to draw on the media content item, wherein the media content item is to be included for transmission in an interactive exchange of media content.

4. The computer-implemented method of claim 3, wherein the drawing is overlaid on top of the media content item, and wherein the drawing overlaid on top of the media content item is to be included for transmission in the interactive exchange of media content.

5. The computer-implemented method of claim 3, further comprising detecting, by the computing system, an initiation of a response to the interactive exchange of media content, wherein the response comprises an image, video, or text.

6. The computer-implemented method of claim 1, wherein the first dimension is associated with a vertical direction, and wherein the first drawing option is provided as a vertical color bar.

7. The computer-implemented method of claim 1, wherein the second dimension is associated with a horizontal direction, and wherein the second drawing option is provided as a drawing tool size option that is selectable in the horizontal direction.

8. The computer-implemented method of claim 1, wherein the first current state of the first drawing option includes a current color selection, wherein the second current state of the second drawing option includes a current drawing tool size selection, and wherein the first current state of the first drawing option and the second current state of the second drawing option are indicated via:
providing a circular indicator that indicates in real-time the current color selection and the current drawing tool size selection.

9. The computer-implemented method of claim 1, wherein the drawing comprises writing in text.

10. The computer-implemented method of claim 1, further comprising:
playing audio based on the drawing to the media content item, the audio including at least one of a music track or a sound effect.

11. A system comprising:
at least one processor; and
a memory storing instructions that, when executed by the at least one processor, cause the system to perform:
receiving a media content item captured by a camera;
detecting an initiation of a drawing to the media content item
providing a first drawing option presented in a first dimension, wherein a first current state of the first drawing option is selectable via progression along a touchscreen display in the first dimension;
providing a second drawing option presented in a second dimension, wherein a second current state of the second drawing option is selectable via progression along the touchscreen display in the second dimension;
providing a third drawing option that is selectable based on a length of time a user contacts a touchscreen display exceeding a time threshold, wherein the third drawing option allows a user to select a drawing tool type by utilizing a time-based cycling to cycle through and select from a plurality of drawing tool types; and
drawing on the media content item based on the selected options;
wherein the first, second, and third drawing options are selectable with a single continuous interaction with the touchscreen display.

12. The system of claim 11, wherein the detecting of the initiation of the drawing to the media content item further comprises:
determining that a user has activated a drawing mode to draw on the media content item, wherein the media content item is to be included for transmission in an interactive exchange of media content.

13. The system of claim 12, further comprising detecting an initiation of a response to the interactive exchange of media content, wherein the response comprises an image, video, or text.

14. The system of claim 11, wherein the drawing comprises writing in text.

15. The system of claim 11, wherein the first current state of the first drawing option includes a current color selection, wherein the second current state of the second drawing option includes a current drawing tool size selection, and wherein the first current state of the first drawing option and the second current state of the second drawing option are indicated via:
providing a circular indicator that indicates in real-time the current color selection and the current drawing tool size selection.

16. A non-transitory computer-readable storage medium including instructions that, when executed by at least one processor of a computing system, cause the computing system to perform:
receiving a media content item captured by a camera;
detecting an initiation of a drawing to the media content item;
providing a first drawing option presented in a first dimension, wherein a first current state of the first drawing option is selectable via progression along a touchscreen display in the first dimension;
providing a second drawing option presented in a second dimension, wherein a second current state of the second drawing option is selectable via progression along the touchscreen display in the second dimension;
providing a third drawing option that is selectable based on a length of time a user contacts the touchscreen display, wherein the third drawing option allows a user to utilize a time-based cycling to cycle through and select a drawing tool type from a plurality of drawing tool types by contacting the touchscreen display beyond a time threshold; and
drawing on the media content item based on the selected options;
wherein the first, second, and third drawing options are selectable with a single continuous interaction with the touchscreen display.

17. The non-transitory computer-readable storage medium of claim 16, wherein the detecting of the initiation of the drawing to the media content item further comprises:
    determining that a user has activated a drawing mode to draw on the media content item, wherein the media content item is to be included for transmission in an interactive exchange of media content.

18. The non-transitory computer-readable storage medium of claim 17, further comprising detecting an initiation of a response to the interactive exchange of media content, wherein the response comprises an image, video, or text.

19. The non-transitory computer-readable storage medium of claim 16, wherein the drawing comprises writing in text.

20. The non-transitory computer-readable storage medium of claim 16, wherein the first current state of the first drawing option includes a current color selection, wherein the second current state of the second drawing option includes a current drawing tool size selection, and wherein the indicating of the first current state of the first drawing option and the second current state of the second drawing option further comprises:
    providing a circular indicator that indicates in real-time the current color selection and the current drawing tool size selection.

* * * * *